United States Patent
Paradise et al.

(10) Patent No.: US 8,396,758 B2
(45) Date of Patent: Mar. 12, 2013

(54) SYSTEMS AND METHODS FOR CONFIRMING PURCHASES OF PRODUCTS FROM A RETAIL ESTABLISHMENT USING A MOBILE DEVICE

(75) Inventors: Andrew Paradise, Sudbury, MA (US); Dan Richard Preston, Palo Alto, CA (US); Jose H. Mercado, Jr., Cambridge, MA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/966,434

(22) Filed: Dec. 13, 2010

(65) Prior Publication Data

US 2011/0145092 A1 Jun. 16, 2011

Related U.S. Application Data

(60) Provisional application No. 61/286,005, filed on Dec. 13, 2009.

(51) Int. Cl.
*G06Q 30/00* (2012.01)
(52) U.S. Cl. .................. 705/26.62; 705/26.1
(58) Field of Classification Search ............. 705/26.62, 705/27.1, 26.1
See application file for complete search history.

(56) References Cited

U.S. PATENT DOCUMENTS

| | | | |
|---|---|---|---|
| 5,494,136 A | 2/1996 | Humble | |
| 5,592,560 A | 1/1997 | Deaton et al. | |
| 5,918,211 A | 6/1999 | Sloane | |
| 5,923,735 A | 7/1999 | Swartz et al. | |
| 6,055,513 A | 4/2000 | Katz et al. | |
| 6,179,206 B1 | 1/2001 | Matsumori | |
| 6,243,447 B1 | 6/2001 | Swartz et al. | |
| 6,292,786 B1 | 9/2001 | Deaton et al. | |
| 6,381,582 B1 | 4/2002 | Walker et al. | |
| 6,434,530 B1 | 8/2002 | Sloane et al. | |
| 6,487,540 B1* | 11/2002 | Smith et al. | 705/21 |
| 6,507,279 B2 | 1/2003 | Loof | |
| 6,512,919 B2 | 1/2003 | Ogasawara | |
| 6,577,861 B2 | 6/2003 | Ogasawara | |
| 6,681,989 B2 | 1/2004 | Bodin | |
| 6,687,345 B1 | 2/2004 | Swartz et al. | |
| 6,687,346 B1 | 2/2004 | Swartz et al. | |
| 6,827,260 B2 | 12/2004 | Stoutenburg et al. | |
| 6,877,093 B1 | 4/2005 | Desai et al. | |
| 6,926,202 B2 | 8/2005 | Noonan | |
| 6,965,868 B1 | 11/2005 | Bednarek | |
| 6,975,856 B2 | 12/2005 | Ogasawara | |

(Continued)

OTHER PUBLICATIONS

Mershon, A, "More Grocers Taking Steps to Curb Shoplifting," Newhouse News Service, Oct. 13, 1998.*

(Continued)

*Primary Examiner* — Brandy A Zukanovich
(74) *Attorney, Agent, or Firm* — Osha Liang LLP

(57) ABSTRACT

Techniques for confirming purchases of products from a retail establishment using a mobile device allow for loss prevention personnel at a retail establishment to confirm that users exiting the retail establishment in possession of physical products have legitimately purchased those products via their mobile devices while within the retail establishment. When a purchase facilitating server, in communication with a user's mobile device, transacts the user's purchase of one or more products within the retail establishment, the purchase facilitating server may generate a purchase confirmation as a receipt of the transaction. The receipt may include a purchase confirmation code and/or one or more visual indicators of an estimated likelihood of theft associated with the corresponding transaction. The receipt may be transmitted to a loss prevention device at the retail establishment, for use by loss prevention personnel in matching against the user's physical cart before the user exits the retail establishment.

48 Claims, 6 Drawing Sheets

U.S. PATENT DOCUMENTS

| | | | |
|---|---|---|---|
| 6,993,498 B1 | 1/2006 | Deaton et al. | |
| 7,086,584 B2 | 8/2006 | Stoutenburg et al. | |
| 7,097,094 B2 | 8/2006 | Lapstun et al. | |
| 7,231,357 B1 | 6/2007 | Shanman et al. | |
| 7,243,849 B2 | 7/2007 | Lapstun et al. | |
| 7,280,979 B1 | 10/2007 | Katz et al. | |
| 7,283,974 B2 | 10/2007 | Katz et al. | |
| 7,357,323 B2 | 4/2008 | Silverbrook et al. | |
| 7,386,485 B1 | 6/2008 | Mussman et al. | |
| 7,464,050 B1 | 12/2008 | Deaton et al. | |
| 7,506,809 B2 | 3/2009 | Stoutenburg et al. | |
| 7,537,160 B2 | 5/2009 | Silverbrook et al. | |
| 7,546,254 B2 | 6/2009 | Bednarek | |
| 7,571,139 B1 | 8/2009 | Giordano et al. | |
| 7,593,873 B1 | 9/2009 | Oakes, III | |
| 7,634,448 B1 | 12/2009 | Ramachandran | |
| 2003/0120607 A1* | 6/2003 | Piotrowski | 705/64 |
| 2004/0148226 A1* | 7/2004 | Shanahan | 705/26 |
| 2004/0245332 A1 | 12/2004 | Silverbrook et al. | |
| 2006/0036462 A1 | 2/2006 | King et al. | |
| 2007/0210155 A1* | 9/2007 | Swartz et al. | 235/383 |
| 2008/0126210 A1 | 5/2008 | Shanahan | |
| 2008/0167991 A1 | 7/2008 | Carlson et al. | |
| 2009/0045955 A1* | 2/2009 | Ulrich | 340/572.1 |
| 2009/0163183 A1 | 6/2009 | O'Donoghue et al. | |
| 2009/0254971 A1 | 10/2009 | Herz et al. | |

OTHER PUBLICATIONS

Jain, V., Impact Report, "aisle411 unveils in-store mobile shopping tool with navigation feature", Market Insight Service, Nov. 3, 2010, 3 pages.

International Search Report and Written Opinion from International Application No. PCT/US10/03157 dated Feb. 7, 2011.

* cited by examiner

SYSTEMS AND METHODS FOR CONFIRMING PURCHASES OF PRODUCTS FROM A RETAIL ESTABLISHMENT USING A MOBILE DEVICE

CROSS-REFERENCE TO RELATED APPLICATIONS

This application claims a priority benefit, under 35 U.S.C. §119(e), to U.S. provisional application Ser. No. 61/286,005, entitled "Systems and Methods for Purchasing Products from a Retail Establishment Using a Mobile Device", filed Dec. 13, 2009, which is incorporated herein by reference in its entirety.

BACKGROUND

Retail merchants selling products at a physical store often make great efforts to attract larger numbers of customers to the store, in order to increase sales. Each customer that shops in a retail store represents a potential purchase, and each purchase that is actually made increases the sales volume, and thereby the profits, of the retail merchant. Retail merchants have an incentive to process as many customer purchase transactions as possible during a given time frame in order to maximize sales.

A retail establishment's potential sales are necessarily limited by the number of customers willing to make purchases at the store. However, sales can also be limited by the amount of time required to process customer purchases at the retail establishment's sales registers. Each customer purchase requires a certain nontrivial amount of time to complete; for example, in a typical credit card transaction, a customer places items to be purchased on the counter, a sales clerk scans each item and totals the cost on the register, the customer locates a credit card, the sales clerk swipes the credit card, the payment is processed, the customer signs a receipt, the sales clerk places the items in bags, and each of these actions takes time.

As a result, there is a limit to the number of customer purchases that can be completed per register, per unit of time in a retail establishment. If more than that number of customers are in the store and willing to make purchases, they may have to wait in line due to backlogs at the registers. This often results in lost sales, as customers become frustrated in line and decide to leave the store without making their purchases rather than wait in line. Merchandise can also easily become misplaced when customers abandon their items and leave the store without returning the items to their proper display locations. This creates an additional burden on the retail establishment to identify misplaced items and return them to their proper locations.

Point-of-sale backlogs can also reduce sales by causing fewer customers to be attracted to shop at the retail establishment. If customers anticipate frustrating experiences waiting in long register lines, some may decide against visiting the store in the first place. This can be a common occurrence especially at peak shopping times or during special sale events, for example during holiday seasons. Retail establishments may organize special sale events and promotions in an effort to attract large numbers of customers to the store; however, the increased sales potential offered by such efforts may be diminished by the effects of time-consuming point-of-sale procedures.

SUMMARY

One type of embodiment is directed to a method of transacting a user's purchase of a product from a retail establishment, the method performed, at least in part, by a computer system comprising at least one hardware processor, the method comprising: receiving, from a mobile device of the user, identifier information that identifies a product being offered for sale by a retail establishment, wherein the identifier information is derived from an image obtained via an image acquisition component operatively connected to the mobile device of the user, wherein the image is obtained while the user and the mobile device are within the retail establishment; accessing product information for the product; transmitting the product information to the mobile device; receiving an indication from the mobile device to purchase the product, the indication comprising payment information for purchasing the product; processing at least the payment information via the at least one hardware processor to transact the user's purchase of the product from the retail establishment; and transmitting to the mobile device a purchase confirmation indicating that the product has been purchased from the retail establishment by the user.

Another type of embodiment is directed to at least one tangible computer-readable storage medium encoded with a plurality of computer-executable instructions that, when executed in a computer system comprising at least one hardware processor, perform a method of transacting a user's purchase of a product from a retail establishment, the method comprising: receiving, from a mobile device of the user, identifier information that identifies a product being offered for sale by a retail establishment, wherein the identifier information is derived from an image obtained via an image acquisition component operatively connected to the mobile device of the user, wherein the image is obtained while the user and the mobile device are within the retail establishment; accessing product information for the product; transmitting the product information to the mobile device; receiving an indication from the mobile device to purchase the product, the indication comprising payment information for purchasing the product; processing at least the payment information to transact the user's purchase of the product from the retail establishment; and transmitting to the mobile device a purchase confirmation indicating that the product has been purchased from the retail establishment by the user.

Another type of embodiment is directed to a system comprising: at least one hardware processor; and at least one memory storing processor-executable instructions that, when executed by the at least one processor, perform a method of transacting a user's purchase of a product from a retail establishment, the method comprising: receiving, from a mobile device of the user, identifier information that identifies a product being offered for sale by a retail establishment, wherein the identifier information is derived from an image obtained via an image acquisition component operatively connected to the mobile device of the user, wherein the image is obtained while the user and the mobile device are within the retail establishment; accessing product information for the product; transmitting the product information to the mobile device; receiving an indication from the mobile device to purchase the product, the indication comprising payment information for purchasing the product; processing at least the payment information to transact the user's purchase of the product from the retail establishment; and transmitting to the mobile device a purchase confirmation indicating that the product has been purchased from the retail establishment by the user.

Another type of embodiment is directed to a method of purchasing a product from a retail establishment, the method performed, at least in part, by a mobile device comprising at least one hardware processor, the method comprising: obtaining, via an image acquisition component operatively coupled to the mobile device, an image comprising information that identifies a product being offered for sale by a retail establishment; transmitting the image, or a product identifier determined from the image, from the mobile device to a purchase facilitating service provider; receiving at the mobile device, in response to transmitting the image or product identifier, product information comprising description and/or price information for the identified product; displaying the product information on a display of the mobile device; receiving input from a user of the mobile device, the input comprising an indication to purchase the product and payment information for purchasing the product; in response to receiving the input comprising the indication, transmitting the payment information from the mobile device to the purchase facilitating service provider; and receiving at the mobile device, in response to transmitting the payment information, a purchase confirmation from the purchase facilitating service provider, the purchase confirmation indicating that the product has been purchased from the retail establishment by the user of the mobile device.

Another type of embodiment is directed to at least one tangible computer-readable storage medium encoded with a plurality of computer-executable instructions that, when executed in a mobile device comprising at least one hardware processor, perform a method of purchasing a product from a retail establishment, the method comprising: obtaining, via an image acquisition component operatively coupled to the mobile device, an image comprising information that identifies a product being offered for sale by a retail establishment; transmitting the image, or a product identifier determined from the image, from the mobile device to a purchase facilitating service provider; receiving at the mobile device, in response to transmitting the image or product identifier, product information comprising description and/or price information for the identified product; displaying the product information on a display of the mobile device; receiving input from a user of the mobile device, the input comprising an indication to purchase the product and payment information for purchasing the product; in response to receiving the input comprising the indication, transmitting the payment information from the mobile device to the purchase facilitating service provider; and receiving at the mobile device, in response to transmitting the payment information, a purchase confirmation from the purchase facilitating service provider, the purchase confirmation indicating that the product has been purchased from the retail establishment by the user of the mobile device.

Another type of embodiment is directed to a system comprising: at least one hardware processor; and at least one memory storing processor-executable instructions that, when executed by the at least one processor, perform a method of purchasing a product from a retail establishment, the method comprising: obtaining, via an image acquisition component operatively coupled to a mobile device, an image comprising information that identifies a product being offered for sale by a retail establishment; transmitting the image, or a product identifier determined from the image, from the mobile device to a purchase facilitating service provider; receiving at the mobile device, in response to transmitting the image or product identifier, product information comprising description and/or price information for the identified product; displaying the product information on a display of the mobile device; receiving input from a user of the mobile device, the input comprising an indication to purchase the product and payment information for purchasing the product; in response to receiving the input comprising the indication, transmitting the payment information from the mobile device to the purchase facilitating service provider; and receiving at the mobile device, in response to transmitting the payment information, a purchase confirmation from the purchase facilitating service provider, the purchase confirmation indicating that the product has been purchased from the retail establishment by the user of the mobile device.

Another type of embodiment is directed to a method of suggesting products for purchase by a user of a mobile device from a retail establishment, the method performed, at least in part, by a computer system comprising at least one hardware processor, the method comprising: identifying, based on identifier information, a first product selected by the user within the retail establishment; identifying, via the at least one hardware processor, at least one second product to suggest for purchase; and transmitting suggestion information to the mobile device, the suggestion information suggesting the at least one second product to the user for purchase from the retail establishment.

Another type of embodiment is directed to at least one tangible computer-readable storage medium encoded with a plurality of computer-executable instructions that, when executed in a computer system comprising at least one hardware processor, perform a method of suggesting products for purchase by a user of a mobile device from a retail establishment, the method comprising: identifying, based on identifier information, a first product selected by the user within the retail establishment; identifying at least one second product to suggest for purchase; and transmitting suggestion information to the mobile device, the suggestion information suggesting the at least one second product to the user for purchase from the retail establishment.

Another type of embodiment is directed to a system comprising: at least one hardware processor; and at least one memory storing processor-executable instructions that, when executed by the at least one processor, perform a method of suggesting products for purchase by a user of a mobile device from a retail establishment, the method comprising: identifying, based on identifier information, a first product selected by the user within the retail establishment; identifying at least one second product to suggest for purchase, based on an association between the first product and the at least one second product; and transmitting suggestion information to the mobile device, the suggestion information suggesting the at least one second product to the user for purchase from the retail establishment.

Another type of embodiment is directed to a method performed, at least in part, by a mobile device comprising at least one hardware processor, the method comprising: obtaining, via an image acquisition component operatively connected to the mobile device, an image comprising information that identifies a first product being offered for sale by a retail establishment; transmitting the image, or a product identifier determined from the image, from the mobile device to a purchase facilitating service provider; receiving at the mobile device, in response to transmitting the image or product identifier, suggestion information suggesting at least one second product for purchase from the retail establishment; and displaying the suggestion information on a display of the mobile device.

Another type of embodiment is directed to at least one tangible computer-readable storage medium encoded with a plurality of computer-executable instructions that, when executed in a mobile device comprising at least one hardware processor, perform a method comprising: obtaining, via an image acquisition component operatively connected to the mobile device, an image comprising information that identifies a first product being offered for sale by a retail establishment; transmitting the image, or a product identifier determined from the image, from the mobile device to a purchase facilitating service provider; receiving at the mobile device, in response to transmitting the image or product identifier, suggestion information suggesting at least one second product for purchase from the retail establishment; and displaying the suggestion information on a display of the mobile device.

Another type of embodiment is directed to a system comprising: at least one hardware processor; and at least one memory storing processor-executable instructions that, when executed by the at least one processor, perform a method comprising: obtaining, via an image acquisition component operatively connected to a mobile device, an image comprising information that identifies a first product being offered for sale by a retail establishment; transmitting the image, or a product identifier determined from the image, from the mobile device to a purchase facilitating service provider; receiving at the mobile device, in response to transmitting the image or product identifier, suggestion information suggesting at least one second product for purchase from the retail establishment; and displaying the suggestion information on a display of the mobile device.

Another type of embodiment is directed to a method of transacting a user's purchase of one or more products from a retail establishment, the method performed, at least in part, by a computer system comprising at least one hardware processor, the method comprising: receiving an indication from a mobile device in the retail establishment to purchase the one or more products from the retail establishment, the indication comprising payment information for purchasing the one or more products; processing at least the payment information via at least one processor to transact the user's purchase of the one or more products from the retail establishment; generating a purchase confirmation identifying the one or more products purchased by the user; and transmitting the purchase confirmation to a loss prevention device at the retail establishment.

Another type of embodiment is directed to at least one tangible computer-readable storage medium encoded with a plurality of computer-executable instructions that, when executed, perform a method of transacting a user's purchase of one or more products from a retail establishment, the method comprising: receiving an indication from a mobile device in the retail establishment to purchase the one or more products from the retail establishment, the indication comprising payment information for purchasing the one or more products; processing at least the payment information to transact the user's purchase of the one or more products from the retail establishment; generating a purchase confirmation identifying the one or more products purchased by the user; and transmitting the purchase confirmation to a loss prevention device at the retail establishment.

Another type of embodiment is directed to a system comprising: at least one hardware processor; and at least one memory storing processor-executable instructions that, when executed by the at least one processor, perform a method of transacting a user's purchase of one or more products from a retail establishment, the method comprising: receiving an indication from a mobile device in the retail establishment to purchase the one or more products from the retail establishment, the indication comprising payment information for purchasing the one or more products; processing at least the payment information to transact the user's purchase of the one or more products from the retail establishment; generating a purchase confirmation identifying the one or more products purchased by the user; and transmitting the purchase confirmation to a loss prevention device at the retail establishment.

Another type of embodiment is directed to a method of purchasing one or more products from a retail establishment, the method being implemented in part on a mobile device comprising at least one hardware processor, the method comprising: receiving, at the mobile device, input from a user of the mobile device, the input comprising an indication to purchase one or more products and payment information for purchasing the one or more products; transmitting the payment information from the mobile device to the purchase facilitating service provider; receiving at the mobile device, in response to transmitting the payment information, a purchase confirmation code from the purchase facilitating service provider; and communicating the purchase confirmation code to loss prevention personnel prior to the user removing the one or more products from the retail establishment.

Another type of embodiment is directed to at least one tangible computer-readable storage medium in a mobile device encoded with a plurality of computer-executable instructions that, when executed by a processor of the mobile device, perform a method of purchasing one or more products from a retail establishment, the method comprising: receiving, at the mobile device, input from a user of the mobile device, the input comprising an indication to purchase the one or more products and payment information for purchasing the one or more products; transmitting the payment information from the mobile device to the purchase facilitating service provider; receiving at the mobile device, in response to transmitting the payment information, a purchase confirmation code from the purchase facilitating service provider; and communicating the purchase confirmation code to loss prevention personnel prior to the user removing the one or more products from the retail establishment.

Another type of embodiment is directed to a mobile device comprising: at least one processor; and at least one memory storing processor-executable instructions that, when executed by the at least one processor, perform a method of purchasing one or more products from a retail establishment, the method comprising: receiving input from a user of the mobile device, the input comprising an indication to purchase the one or more products and payment information for purchasing the one or more products; transmitting the payment information from the mobile device to the purchase facilitating service provider; receiving at the mobile device, in response to transmitting the payment information, a purchase confirmation code from the purchase facilitating service provider; and communicating the purchase confirmation code to loss prevention personnel prior to the user removing the one or more products from the retail establishment.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that sales losses due to point-of-sale backlogs may be reduced through alternate systems and methods for purchasing products from retail establishments—systems and methods that do not rely on store personnel to process customer purchases in the conventional manner. Accordingly, some embodiments of the present invention relate to techniques by which customers may initiate their own purchase transactions on mobile devices while shopping in a retail establishment, without needing to approach a sales register. For purposes of the present disclosure, the term "retail establishment" refers to a physical site at which a retail merchant (e.g., an individual, a group of individuals, or a retail corporation) offers physical products for sale. A human customer (who may be a user of a mobile device) may enter a retail establishment, purchase physical products there, and carry the physical products out of the retail establishment under the customer's newly established ownership pursuant to the purchase transaction.

Some embodiments of the present invention relate to a mobile device application program that enables a customer to scan items to be purchased, initiate a purchase of those items, and receive a receipt confirming the purchase, while the customer navigates the aisles of the retail establishment. As such, the customer need not bring items to a register for scanning (by the customer or a store employee) or payment. In some embodiments, the mobile device application program can also present offers or suggestions of products and/or bundles for sale from manufacturers and/or the retail establishment, which the customer can accept using the mobile device application program. In some embodiments, the receipt received at the mobile device as confirmation of the purchase may be augmented beyond the conventional listing of products purchased and prices paid. For example, an augmented receipt may include one or more unique codes and/or visual indicators for communication to loss prevention personnel to aid in theft prevention.

Figure 1:
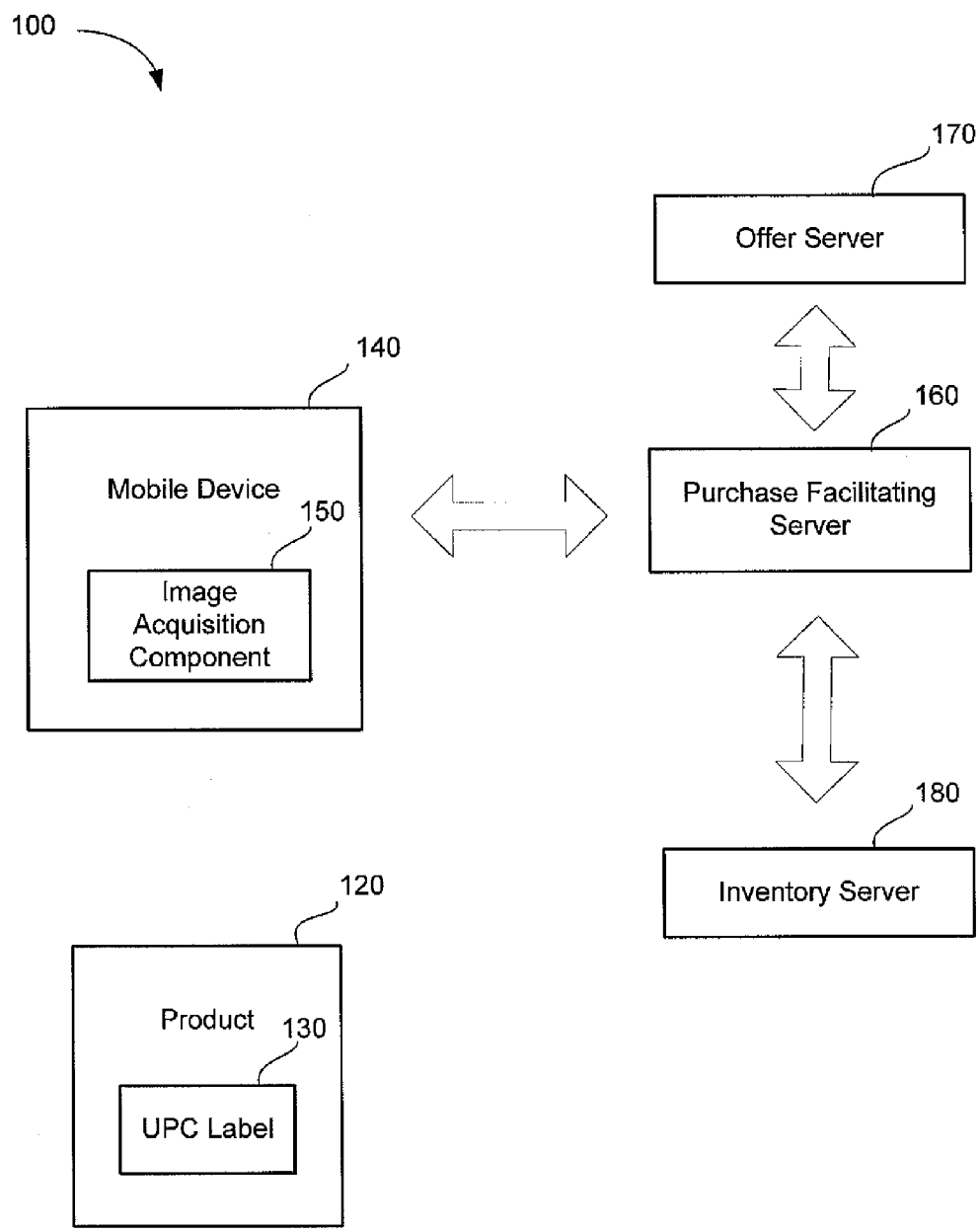
FIG. 1 is a block diagram illustrating an exemplary system for purchasing products from a retail establishment using a mobile device, in accordance with some embodiments of the present invention.

FIG. 1 illustrates an exemplary operating environment 100 in which a mobile device 140 (e.g., a mobile telephone, personal digital assistant (PDA), or other handheld device) may be used to purchase a product 120 from a retail establishment, in accordance with some embodiments of the present invention. As depicted, operating environment 100 includes a purchase facilitating server 160, an offer server 170 and an inventory server 180. Each of these servers may be implemented in any suitable way, as aspects of the present invention are not limited in this respect. In some embodiments, each server may be implemented as a computer system including one or more computers or other processing devices (e.g., microprocessors) programmed to perform the functions described herein. However, in some embodiments, functions described by way of example as being performed by different servers or computer systems may be integrated into a single computer system, and various functions described herein may be divided and distributed in any suitable fashion. The processing devices of purchase facilitating server 160, offer server 170 and inventory server 180 may be capable of communicating (i.e., transmitting and receiving) data with each other through any suitable local and/or long-distance network connections, as aspects of the present invention are not limited in this respect. In some embodiments, purchase facilitating server 160 may be a hardware and software platform of a purchase facilitating service provider (the purchase facilitating service provider may be, e.g., a person, corporation or other entity), while inventory server 180 may be a hardware and software platform associated with the retail establishment, e.g., for monitoring inventories of products physically being offered for sale at the retail establishment. In some embodiments, inventory server 180 may be associated with only one retail establishment; in other embodiments, inventory server 180 may be associated with multiple retail establishments of the same retail corporation, or even with multiple retail corporations or other retail entities, as aspects of the present invention are not limited in this respect. In some embodiments, while inventory server 180 may be associated with any number of retail establishments, it may maintain separate inventory records for each retail establishment with which it is associated.

Mobile device 140 may be any mobile and/or handheld device having a processing capability, such as a cellular phone or a PDA. In some embodiments, mobile device 140 may be operatively connected to an image acquisition component 150, for example a camera (e.g., a digital camera) integrated into the mobile device 140. Image acquisition component 150 may be any device component capable of capturing an image of information identifying a product. Such information may include, for example, an image of a bar code (e.g., universal product code (UPC) or European Article Number (EAN) label 130) affixed to product 120, an image of product 120 itself, an image of all or a portion of the packaging of product 120, or any other image that includes information identifying the product 120. In the examples below, label 130 is described as being a UPC bar code. However, this is merely an example, as label 130 may include any suitable product identifying number or character sequence (which may be unencoded and/or may be encoded in any suitable barcode or encoded in any other suitable way), or other visible identifier, or may be any other information usable to identify product 120.

In some embodiments, when a user of mobile device 140 intends to purchase a product 120 in a retail establishment, the user may use the image acquisition component 150 of the mobile device 140 to obtain an image that includes the product's UPC label 130 or other information identifying the product 120. The mobile device 140 may be programmed with a software application program to communicate with a purchase facilitating server 160 to transact the user's purchase of products such as product 120. Such an application program may be installed on the mobile device in any of a number of ways, as aspects of the present invention are not limited in this respect. For example, the user may download the application program to the mobile device 140 from a website of a developer of the application, from the purchase facilitating service provider associated with purchase facilitating server 160, from the retail establishment, or from any other suitable source.

In some embodiments, mobile device 140 may transmit the image of UPC label 130 to purchase facilitating server 160 through any suitable network connection(s) by which mobile device 140 and purchase facilitating server 160 may communicate to exchange data. In some embodiments, purchase facilitating server 160 may have access to any of various image recognition processes by which the UPC code of product 120 may be determined from the image taken of the UPC label 130. Alternatively or additionally, such image recognition processes may be accessible by mobile device 140, for determining a product identifier such as a bar code number from an image taken of a bar code such as UPC label 130 or other product-identifying indicia visible on product 120. In some embodiments, the image taken by the image acquisition component may be processed at mobile device 140, e.g., as part of execution of the purchase facilitation application program, to determine a product identifier (e.g., the UPC bar code number) for product 120 from the image (e.g., of UPC label 130). Mobile device 140 may then transmit the product identifier, with or without the image itself, to purchase facilitating server 160, the transmission representing the user's selection of product 120 for potential purchase from the retail establishment.

Mobile device 140 and/or purchase facilitating server 160 may use any suitable image recognition technique(s) to determine a product identifier from an image of indicia on product 120, as aspects of the present invention are not limited in this respect. In some embodiments, such image recognition may involve selecting a horizontal slice of the image of the bar code (e.g., on UPC label 130), and matching the slice to a valid sequence of digits forming a bar code (e.g., UPC) number. In some embodiments, image intensity data from the image slice may be analyzed to determine a sequence of peaks and valleys representing the alternating black and white vertical lines of the bar code, and the sequence of peaks and valleys may be converted to a digit sequence corresponding to the bar code number. One example of known bar code recognition software that may be used in some embodiments by mobile device 140 and/or purchase facilitating server 160 is ZXing ("Zebra Crossing"), currently available from Google™ Code.

Accordingly, in some embodiments, purchase facilitating server 160 may receive identifier information (e.g., a bar code number) from mobile device 140, or may determine the identifier information by performing image recognition on an image (e.g., of a bar code) received from mobile device 140. The image may have been obtained via image acquisition component 140 while mobile device 140 and its user are within the retail establishment, by photographing product-identifying indicia (e.g., UPC label 130) on product 120 within the retail establishment. In some embodiments, purchase facilitating server 160 may also have access to product information for product 120 through communication with an inventory server 180. In some embodiments, either purchase facilitating server 160, inventory server 180 or both may maintain a data set associating various identifiers (e.g., bar code numbers) for products offered for sale by the retail establishment with corresponding product information for those products. By accessing the data set and looking up the product identifier derived from the image taken by image acquisition component 150, purchase facilitating server 160 may identify product 120 as the product selected by the user of mobile device 140 for potential purchase from the retail establishment. In some embodiments, purchase facilitating server 160 may retrieve product information for product 120 from the data set. Such product information may include, in some embodiments, the name of product 120, the price of product 120, a description (e.g., a textual product description) of product 120, a thumbnail image of product 120 and/or any of a variety of other types of information about product 120. Purchase facilitating server 160 may transmit some or all of this product information to mobile device 140, in response to mobile device 140's transmission of the image and/or product identifier. In some embodiments, mobile device 140 may then display the product information to the user on a display component, for the user's consideration in determining whether or not to purchase product 120. In some embodiments, purchase facilitating server 160 may also transmit the product identifier (e.g., the bar code number) for product 120 to mobile device 140, whether or not the product identifier was previously identified by mobile device 140.

In some instances, product 120 may be one of multiple products that the user has selected for potential purchase from the retail establishment. The user may have performed such selection by photographing identifying indicia on each product, transmitting each product image, or corresponding product identifier information derived therefrom, to purchase facilitating server 160, and receiving product information for each product in response. In some embodiments, performing these steps may serve to add each selected product to an electronic "shopping cart" (e.g., a list of selected products by bar code number, with corresponding product information in some embodiments) maintained by the software application on mobile device 140. In some embodiments, the user may add products to the electronic cart at any time while within the retail establishment by photographing identifying indicia (e.g., UPC bar code labels) on the products to add. In some embodiments, the user may also remove one or more products from the electronic cart at any time while within the retail establishment. For example, the user may select, on a display of mobile device 140, a product in the electronic cart that the user no longer wishes to purchase, and may press a key, select a button, or perform any other suitable user input action to remove the unwanted product from the electronic cart.

In some embodiments, the purchase facilitating application program executing on mobile device 140 may provide an option for the user to view the current contents of the electronic shopping cart. When this option is selected through suitable user input, a list of products currently in the electronic cart, optionally along with corresponding product information, may be displayed on the display of mobile device 140 for the user to view. From this display, the user may be able to remove from the electronic cart any products that the user no longer wishes to purchase. In some embodiments, when the user is ready to purchase the products remaining in the electronic cart, including product 120, the user can use the application program on the mobile device 140 to transact the purchase through purchase facilitating server 160. The user may submit an indication to purchase the products in the electronic cart, including product 120, through any suitable user input, for example by selecting a "check-out" button or icon on the display of mobile device 140.

When the user elects to "check out" and purchase products including product 120, in some embodiments mobile device 140 may transmit payment information to purchase facilitating server 160. For example, in some embodiments the user may enter credit card information into a user interface of the mobile device 140, and the mobile device 140 may transmit the credit card information to the purchase facilitating server 160 to initiate a purchase of product 120. In other embodiments, the user's credit card information or other payment information may be pre-stored in mobile device 140, in an account the user has created with the purchase facilitating service provider, or in any other suitable location. In such embodiments, when the user selects "check-out", the pre-stored payment information may be automatically retrieved from its storage location and transmitted to purchase facilitating server 160. In some embodiments, the user may have pre-stored information for multiple credit cards, debit cards and/or other methods of payment, and the application program on mobile device 140 may allow the user to select a method of payment to use during the "check-out" procedure.

In some embodiments, purchase facilitating server 160 may process the payment information received from mobile device 140 to transact the user's purchase of product 120 (and any other items in the electronic cart) and generate a purchase confirmation (e.g., a receipt) confirming the purchase. Such a purchase confirmation receipt may take any suitable form, as aspects of the present invention are not limited in this respect. In some embodiments, a receipt may be a text message or other electronic file or document listing the names and/or bar code numbers of the products purchased in the completed transaction. In some embodiments, a receipt may also include descriptions and/or other information about the purchased products, thumbnail images of the purchased products, and/or any other suitable information. In some embodiments, the receipt may include a unique identifier or code (e.g., a purchase confirmation code), which may comprise any sequence of alphanumeric characters and/or symbols, that may be generated by purchase facilitating server 160 to identify the receipt with the completed transaction. The purchase confirmation code may visibly appear on the receipt, or may be electronically encoded within the receipt in any suitable manner, as aspects of the present invention are not limited in this respect. In some embodiments, a copy of the generated receipt, or information included in the generated receipt, may be stored at purchase facilitating server 160, for example in one or more computer-readable storage media, for future use in user profiling, estimating theft likelihoods, determining product suggestions, etc., examples of which processes are described below.

In some embodiments, purchase facilitating server 160 may transmit the generated receipt to both the mobile device 140 and the inventory server 180 (and/or another processing device associated with the retail establishment) to confirm the purchase to both the user of mobile device 140 and the retail establishment. In this respect, loss prevention personnel (e.g., a security guard, another store employee, or any other human verifier) at the retail establishment may have a device (e.g., a computer, or other processing device) that receives receipts (i.e., the receipts generated by purchase facilitating server 160) from purchase facilitating server 160 and/or inventory server 180 and displays them to the loss prevention personnel. In some embodiments, the same receipt may be transmitted to both mobile device 140 and one or more loss prevention devices manned by loss prevention personnel at the retail establishment. In other embodiments, the receipts transmitted to mobile device 140 and to the loss prevention device(s) may be in different forms, but may identify the same list of products purchased in the transaction. In some embodiments, purchase facilitating server 160 may not transmit a full receipt to mobile device 140, as mobile device 140 may already have stored the product identifiers and/or product information for the purchased product, during the processing performed to create and manipulate the electronic cart prior to the user's actual purchase. In such embodiments, purchase facilitating server 160 may only transmit partial data for the receipt to mobile device 140, and mobile device 140 may generate the full receipt by incorporating data already locally stored. In some embodiments, purchase facilitating server 160 may only transmit the purchase confirmation code to mobile device 140, and mobile device 140 may incorporate the purchase confirmation code into a receipt otherwise fully generated at mobile device 140 using locally stored data.

When the user is ready to leave the physical retail establishment site with the purchased products including product 120, in some embodiments loss prevention personnel may check the receipt on the mobile device 140 against the receipt received at one or more loss prevention devices to validate the purchase and prevent theft as the user exits the physical establishment. In some embodiments, the loss prevention personnel may verify that the purchase confirmation code on the receipt on the mobile device matches the purchase confirmation code on the receipt received at the loss prevention device, to verify that the receipt on the mobile device is genuine. In some embodiments, the same purchase confirmation code may be sent with the receipt to mobile device 140 and to the loss prevention device. In such embodiments, the two purchase confirmation codes may need to be identical for the loss prevention personnel to verify that the receipt on the mobile device is genuine. However, in other embodiments, identical purchase confirmation codes may not be transmitted to both mobile device 140 and the loss prevention device. For example, in some embodiments the two purchase confirmation codes may be different sequences with a mathematical or other electronically coded relationship. In such embodiments, the loss prevention personnel may electronically confirm the relationship between the codes to determine that they match. Thus, verification that the receipt on mobile device 140 is genuine may involve communication of the purchase confirmation code from mobile device 140 to the loss prevention personnel (e.g., directly or through the loss prevention device).

In some embodiments, the user may communicate the purchase confirmation code on mobile device 140 to the loss prevention personnel by physically showing the receipt on the display of mobile device 140 to the loss prevention personnel, with the purchase confirmation code displayed as part of the receipt. The corresponding purchase confirmation code on the loss prevention device may also be displayed on a display of the loss prevention device (which in some embodiments may be obscured from the view of the user of mobile device 140), such that the loss prevention personnel may visually confirm that the two purchase confirmation codes (i.e., the code on mobile device 140 and the code on the loss prevention device) match. In some embodiments, the loss prevention device may display a list of purchase confirmation codes for transactions whose purchasers have not yet left the retail establishment, and the loss prevention personnel may verify that the purchase confirmation code on mobile device 140 appears on the list. In other embodiments, the loss prevention personnel may read the purchase confirmation code on the display of mobile device 140 and enter it into the loss prevention device, such that the loss prevention device may then automatically determine whether it matches a valid purchase confirmation code in the loss prevention device. In yet other embodiments, mobile device 140 may communicate the purchase confirmation code to the loss prevention device electronically in any suitable way, such as via short-range wireless communication. The loss prevention device may then automatically determine whether the two purchase confirmation codes match, and may provide an indication of whether they match on the display of the loss prevention device for the loss prevention personnel to view. Alternatively or additionally, the loss prevention device may also display both purchase confirmation codes, such that the loss prevention personnel can personally verify whether the codes match. In some embodiments, if the purchase confirmation code on mobile device 140 does not match a valid purchase confirmation code received by the loss prevention device, the loss prevention personnel may take action to initiate a response procedure for incidents of potential theft. Such a response procedure may be defined in any suitable way, for example by management personnel of the retail establishment.

The inventors have appreciated that, even when a shopper has a receipt with a valid purchase confirmation code, the user may nevertheless be attempting to steal items by exiting a store with items in a physical shopping cart or shopping bag that he and she did not purchase, along with the items that the shopper did purchase. Thus, in some situations, it may be desirable for loss prevention personnel to visually inspect the user's physical shopping cart or bag(s) to verify that it does not contain any unpurchased items. As such, the inventors have developed techniques to notify the loss prevention personnel what degree of physical/manual inspection of the shopper's items may be warranted. In some embodiments, purchase facilitating server 160 may further augment the receipts it generates with a visual indicator of an estimated likelihood of theft associated with the transaction. Such a visual indicator may take any suitable form, as aspects of the present invention are not limited in this respect. Examples of suitable visual indicators include icons of various shapes and/or colors, textual indicators, symbols, coloring and/or shading applied to the entire receipt or to one or more portions of the receipt, and many others. In some embodiments, the visual indicator may be color-coded to indicate the estimated likelihood of theft associated with the transaction. In one example, a green indicator may indicate a low likelihood of theft, a yellow indicator may indicate a moderate likelihood of theft, and a red indicator may indicate a high likelihood of theft. In some embodiments, the receipt may be augmented with the visual indicator when transmitted to the loss prevention device at the retail establishment, but not when transmitted to mobile device 140. As such, the loss prevention personnel may be alerted to the estimated likelihood of theft associated with the transaction, without knowledge by the user of mobile device 140. However, in other embodiments, the augmented receipt may be transmitted with the same visual indicator to both the loss prevention device and mobile device 140.

In some embodiments, the user of mobile device 140 may interact with loss prevention personnel prior to exiting the retail establishment in possession of one or more products acquired within the retail establishment. In some embodiments, the user may be randomly directed to one of multiple loss prevention devices at which to interact with loss prevention personnel for receipt checking. Such randomization may in some embodiments decrease the likelihood of success of teaming by groups of coordinating shoplifters. In some embodiments, when purchase facilitating server 160 transmits a purchase confirmation to mobile device 140, it may also transmit a randomized number or other alphanumeric sequence corresponding to a number of a loss prevention device in the retail establishment. This sequence may then be displayed on mobile device 140 to direct the user to the corresponding loss prevention device to be cleared by loss prevention personnel to exit the retail establishment. In some embodiments, the sequence may be generated by purchase facilitating server 160 as a hash of the purchase confirmation code. In other embodiments, mobile device 140 may receive a message including a randomized indication to proceed to a loss prevention device having a particular name, or being designated by a particular color or symbol. It should be appreciated that a user of mobile device 140 may be directed to a loss prevention device in a randomized order as compared to other users in any suitable way, as aspects of the present invention are not limited in this respect.

In some embodiments, the visual indicator generated with the receipt may provide an indication of the extent to which the loss prevention personnel should inspect the physical products in the user's possession that the user intends to remove from the retail establishment. For example, in some embodiments, a visual indicator of a low likelihood of theft associated with the transaction (e.g., a green indicator) may indicate that the products the user is removing from the retail establishment need not be checked, or require only a cursory visual examination. On the other hand, a visual indicator of a high likelihood of theft (e.g., a red indicator) may indicate that the loss prevention personnel should more carefully confirm that each of the products in the user's possession is listed in the receipt and therefore has been properly paid for.

Any suitable number of levels of scrutiny may be indicated by the indicator. For example, in some embodiments there may be three degrees of scrutiny indicated respectively by red, green, and yellow indicators on the receipt. In some embodiments, there may be only two degrees of scrutiny, while in other embodiments, there may be four or more degrees of scrutiny that may be indicated by the visual indicator.

In some embodiments, a visual indicator of a high likelihood of theft may require the loss prevention personnel to use electronic devices to inspect the products in the user's possession; e.g., by scanning each product in the user's physical shopping cart with a bar code scanner connected to the loss prevention device, thus allowing the loss prevention device to automatically confirm whether each product appears in the receipt. In some embodiments, visual indicators may be associated with individual products in the receipt on the loss prevention device, to instruct the loss prevention personnel to inspect certain items in the user's physical cart with greater care than other items. For instance, it may be desirable to inspect high-value products such as televisions more readily than lower-value products, for example to make sure that the user did not scan and purchase a lower-price television and then attempt to leave the store with a higher-price television instead.

In some embodiments, purchase facilitating server 160 may estimate a likelihood of theft associated with a current transaction, for use in assigning a visual indicator to the corresponding receipt, through a statistical analysis of various data collected by purchase facilitating server 160. In some embodiments, such data may include profiling information for the user of mobile device 140 and/or other users who have interacted with services provided by purchase facilitating server 160. For example, in some embodiments, purchase facilitating server 160 may estimate a likelihood of theft associated with the current transaction based at least in part on profiling information such as a history of the user of mobile device 140 passing or failing receipt inspections by loss prevention personnel in retail establishments in the past. For instance, if the user has had previous incidents in which the user has shown loss prevention personnel a receipt on a mobile device that did not match any valid receipt on the loss prevention device, or in which the user has attempted to remove products from a retail establishment that were not properly purchased and represented on a valid receipt, these past incidents may increase the estimated likelihood of theft associated with the user's current transaction. In some embodiments, to have such a history available for use in estimating theft likelihood in future transactions, purchase facilitating server 160 may receive reports from the retail establishment as to results of receipt verification by loss prevention personnel, and may store such reports as part of profiling information for individual users.

In some embodiments, purchase facilitating server 160 may estimate a likelihood of theft based at least in part on the products themselves that are being purchased in the current transaction. For example, if the user of mobile device 140 has had a very consistent past purchase history (e.g., predictably purchasing similar products repeatedly), and now is transacting a purchase that deviates from that past purchase history (e.g., purchasing one or more significantly different products that the user has rarely or never purchased before), the estimated likelihood of theft associated with the current transaction may be increased. In some other embodiments, a likelihood of theft may be estimated based solely on the products being purchased, without reference to profiling information for the user. For example, purchase facilitating server 160 may determine, from past records of products in transactions and results of corresponding interactions with loss prevention personnel, that certain combinations of products in transactions may statistically have a higher association with theft than other combinations of products. Thus, if the current transaction includes one or more products that, alone or in combination, are statistically associated with theft, the estimated likelihood of theft associated with the current transaction may be increased.

In some embodiments, purchase facilitating server 160 may estimate a likelihood of theft based at least in part on the user's actions while in the retail establishment, as determined through information received from mobile device 140. For example, mobile device 140 may have a geographic self-locating capability, such as a Geographic Positioning System (GPS), receiver or other location system and may in some embodiments transmit its location information to purchase facilitating server 160 at various times to receive services from purchase facilitating server 160. For example, when a user selects a product for potential purchase by photographing a bar code on the product, mobile device 140 may in some embodiments transmit its geographic location to purchase facilitating server 160 along with the image and/or product identifier, such that purchase facilitating server 160 can identify the correct retail establishment (e.g., the retail establishment in which the mobile device and its user currently are located) with which to transact the purchase. In some embodiments, the location of mobile device 140 may also be communicated to purchase facilitating server 160 by one or more cellular base stations and/or wireless network access points in the vicinity of mobile device 140, that are receiving a nearby communications signal from mobile device 140. In another example, when the user first enters a retail establishment, in some embodiments mobile device 140 may transmit its geographic location, as determined by GPS or by triangulation from nearby signal receivers, to purchase facilitating server 160 so that purchase facilitating server 160 can identify the retail establishment and transmit to mobile device 140 information about sales or other promotions currently available at that retail establishment. In some embodiments, from such location information received from mobile device 140, purchase facilitating server 160 may be able to calculate the length of time that mobile device 140 (and thus, its user) have spent within the retail establishment prior to transacting the current purchase. In some embodiments, such information may be considered as an indicator of theft potential, as a user who spends a long time in a retail establishment, considering many options, may in some cases be considered unlikely to be shoplifting. In some embodiments, such a determination may also be made based at least in part on the level of interaction between the user and mobile device 140 while within the retail establishment, such as comparing products and considering product suggestions, as these activities may be indicative of a low likelihood of theft. In some embodiments, the geographic location of the retail establishment itself may also be considered by purchase facilitating server 160 in its estimate, as some locations may be more prone to theft or to crime in general than are other locations. In some cases, likelihood of theft may also vary in relation to the geographic distance between the retail establishment and the user's home.

It should be appreciated that any suitable data may be considered by purchase facilitating server 160 in estimating a likelihood of theft associated with a current transaction, as aspects of the present invention are not limited in this respect. In addition to the examples described above, other examples of information that may factor into such an estimate include, but are not limited to, monetary values of products listed in the receipt, either in isolation or in relation to monetary values of other products listed in the receipt, retail establishments the user has visited in the past, number of visits the user has made to different retail establishments, the user's demographic information, including gender and age, the length of time the user has had an account with the purchase facilitating service provider, the model of the user's mobile device, records of the user's past purchases, including specific products, categories of products, prices of products, and/or where the products were purchased, average amount the user spends in a single visit to a retail establishment, and/or average amount of time other users spend in the current retail establishment, etc.

In some embodiments, purchase facilitating server 160 may include any or all of the above-mentioned information, and/or any other suitable information, in its estimation of the likelihood of theft associated with the current transaction. In some embodiments, purchase facilitating server 160 may perform processing to input values for such multiple parameters into a statistical model that generates a likelihood value based on the input. Any suitable statistical model may be used, as aspects of the present invention are not limited in this respect. Examples of suitable types of models include decision trees, Bayesian networks, and clustering algorithms such as k-means clustering.

Figure 2:
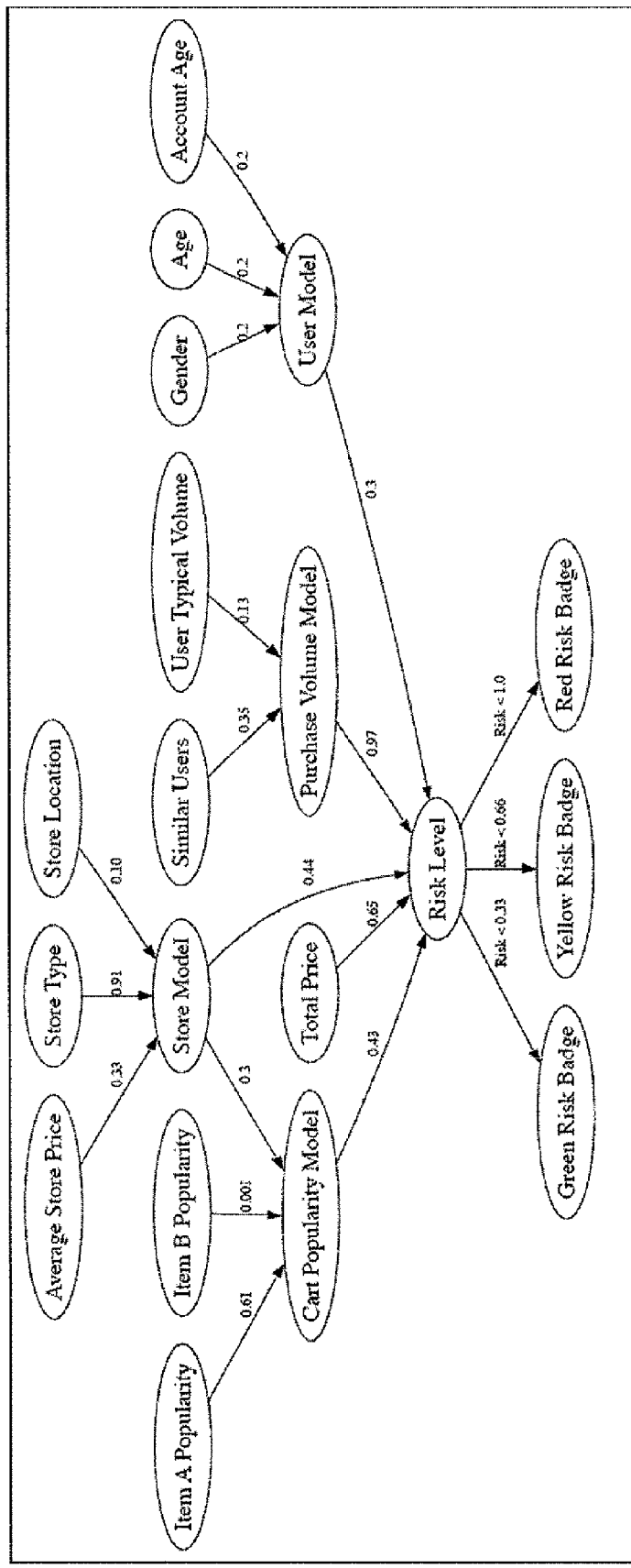
FIG. 2 is an illustration of an exemplary decision diagram for estimating a likelihood of theft associated with a transaction, in accordance with some embodiments of the present invention.

FIG. 2 illustrates one example of a statistical model in the form of a decision diagram that may be used in some embodiments by purchase facilitating server 160 to estimate a likelihood of theft for a current transaction. It should be appreciated that the decision diagram depicted in FIG. 2 is merely one example, as aspects of the present invention are not limited to any particular statistical model used to estimate a likelihood of theft. With reference to this particular example, the decision diagram illustrated in FIG. 2 includes nodes (depicted as ovals) and transitions or "edges" (depicted as arrows). Through the edges of the decision diagram, certain nodes lead to other nodes, and all paths through the nodes eventually lead to one of a set of visual indicators of estimated likelihood of theft (in this case, a green risk badge, a yellow risk badge, or a red risk badge).

In the example decision diagram of FIG. 2, some nodes do not have other nodes that lead to them. These nodes are the input nodes to the decision diagram. In this example, the input nodes represent different items of information that may be collected by purchase facilitating server 160 and input to the decision diagram to determine an estimated likelihood of theft for the current transaction. In this example, the set of input nodes includes an "average store price" node, a "store type" node, a "store location" node, an "item A popularity" node, an "item B popularity" node, a "similar users" node, a "user typical volume" node, a "gender" node, an "age" node, an "account age" node, and a "total price" node. In this example, the "average store price" represents the average price, across users, of an entire purchase (e.g., an entire electronic or physical shopping cart of products purchased) at the retail establishment in which the current transaction takes place. The "store type" represents a category of the retail establishment, such as an "electronics" store, a "grocery" store, or a particular large retail chain. The "store location" represents the town or neighborhood in which the retail establishment is located. The "item popularity" nodes represent a frequency with which one or more products in the current transaction's shopping cart have been purchased in the past, across users and retail establishments. The "similar users" node represents a vector of risk scores of a number of other users that are similar to the current user in terms of purchasing history. The "user typical volume" node represents the average number of products that the current user purchases in a single visit to any retail establishment. The "gender" node represents the current user's gender (e.g., qualitatively expressed as "male" or "female"). The "age" node represents the current user's age in years. The "account age" node represents the length of time that the current user has had an account with the purchase facilitating software application. Finally, the "total price" node represents the total monetary amount purchased in the current transaction.

Some of these input nodes lead to particular intermediate nodes, representing intermediate categories of information useful for grouping data relevant to likelihood of theft. In this example, the intermediate nodes include a "store model" node, a "cart popularity model" node, a "purchase volume model" node, and a "user model" node. For example, the "average store price" node, the "store type" node and the "store location" node feed into the "store model" node to create a model of the way in which an estimated likelihood of theft can be dependent upon aspects of the particular retail establishment in which the current transaction takes place. On the other hand, the "gender" node, the "age" node and the "account age" node are characteristics of the user of the mobile device performing the current transaction, and therefore feed into and define a "user model" node to model the dependencies of the estimated likelihood of theft on aspects of the user.

In this example, the weights on the edges leading from input nodes to intermediate nodes determine the amount of contribution that each input node factor has on the overall intermediate node model. For example, the weight on the edge leading from the "store type" input node to the "store model" intermediate node is 0.91, while the weight on the edge leading from the "store location" input node to the "store model" intermediate node is 0.10. This indicates, in this example, that "store type" information has a greater contribution to the part of the estimated likelihood of theft accounted for by the "store model" than "store location" information does. On the other hand, "gender", "age" and "account age" information all contribute equally to the "user model", as the weights on the edges from each of those three nodes are equally 0.2.

In the example decision diagram of FIG. 2, all paths from input and intermediate nodes eventually lead to a central "risk level" node, at which all of the information represented by the various input nodes is combined together in an overall model. In this example, when the estimated likelihood of theft at the "risk level" node evaluates to less than 0.33, purchase facilitating server 160 generates a green risk badge (e.g., low estimated likelihood of theft) as the visual indicator for the purchase confirmation to be sent to mobile device 140. When the estimated likelihood of theft at the "risk level" node evaluates to between 0.33 and 0.66, a yellow risk badge is generated (e.g., moderate estimated likelihood of theft); and when the estimated likelihood of theft evaluates to between 0.66 and 1.0, a red risk badge is generated (e.g., high estimated likelihood of theft).

In this example, each input node may give rise to a numerical value, i.e., a "node weight", based on how that node evaluates for the characteristics of the current transaction. For input nodes that are defined in terms of qualitative categories, a particular node weight may be assigned to each category, and the input node may evaluate to one of the node weights depending on which category is associated with the current transaction. For example, the "gender" input node may have two categories, "male" and "female". In one example, the "male" category may have an associated node weight of 0.6 while the "female" category may have an associated node weight of 0.4, indicating that a user being male is a factor that may increase the estimated likelihood of theft more than a user being female. For a current transaction by a male user, then, the "gender" input node may evaluate to 0.6. This node weight may then be multiplied by the corresponding edge weight (0.2) when feeding into the "user model" intermediate node. Node weights from the "age" and "account age" input nodes may also be multiplied by their respective edge weights and fed into the "user model" intermediate node, at which the fed-in values may all be multiplied together to yield a "user model" node weight. This node weight may then be multiplied by the edge weight feeding into the "risk level" node (0.3).

For input nodes that are defined in terms of continuous quantitative values, node weights may be evaluated in terms of a continuous distribution relating the quantitative value to a node weight value. For example, the "total price" input node may be defined in terms of a distribution with shopping cart prices on its x-axis and corresponding node weights on its y-axis. When estimating a likelihood of theft for a current transaction of a particular total price, the distribution may be evaluated at that total price to determine a value for the "total price" node weight. That value may then be multiplied by the corresponding edge weight (0.65) and fed into the "risk level" node.

When all input nodes and intermediate nodes in this example have been evaluated to determine node weights, and the node weights multiplied by their corresponding edge weights have all been fed into the "risk level" node, the resulting values received at the "risk level" node may be multiplied together to compute an overall estimated likelihood of theft for the current transaction. As discussed above, this overall value may then be mapped into one of a set of categories to generate an appropriate visual indicator for the receipt to be transmitted from purchase facilitating server 160. Again, it should be appreciated that the decision diagram depicted in FIG. 2 is merely one example. Any suitable technique for estimating a likelihood of theft for the current transaction based on information collected by purchase facilitating server 160 may be used, as aspects of the present invention are not limited in this respect.

In some embodiments, an estimated likelihood of theft for the current transaction may determine whether the purchase confirmation code should be regenerated for the receipt after the user's physical cart is cleared by loss prevention personnel. For instance, if an unscrupulous user were to transact a purchase on his mobile device, and then allow his friend to take a photograph of his receipt, such that both users ended up with the same valid receipt and purchase confirmation code on their mobile devices, the friends could attempt to exit the retail establishment with two identical products, only one of which has been paid for. Regenerating the purchase confirmation code in some embodiments could prevent such an occurrence. In some embodiments, after a valid receipt is cleared by loss prevention personnel, purchase facilitating server 160 may generate a new replacement purchase confirmation code, and may transmit the replacement purchase confirmation code to the mobile device from which the purchase was transacted. Such regeneration of the purchase confirmation code may in some embodiments cause the original purchase confirmation code for the receipt to become invalid. The shoplifting friend may then be left with a photograph of a receipt with a now-invalid purchase confirmation code. When the loss prevention personnel looks up the invalid purchase confirmation code via the loss prevention device and does not find a match, the attempted theft and fraud may be exposed.

In some embodiments, as discussed above, regeneration of the purchase confirmation code may be triggered by an estimated likelihood of theft associated with the current transaction. In other embodiments, however, purchase confirmation codes may be regenerated for all transactions, regardless of their estimated likelihood of theft. In some embodiments, loss prevention personnel may also request code regeneration for a particular receipt, for example by transmitting such a request to purchase facilitating server 160 through the network connection from the loss prevention device. In some instances, loss prevention personnel may request such code regeneration in response to their own observations, suspicions or intuitions from observing the behavior of users at the retail establishment. In some embodiments, a user with a legitimate purchase, whose purchase confirmation code has been regenerated after being cleared by loss prevention personnel, may store the receipt with the replacement purchase confirmation code on his mobile device, such that it can be produced in the event that any of the purchased products need to be returned. During the return, in some embodiments store personnel may access the receipt with the replacement purchase confirmation code from purchase facilitating server 160 and confirm that it matches the receipt on the mobile device.

Figures 3A, 3B:
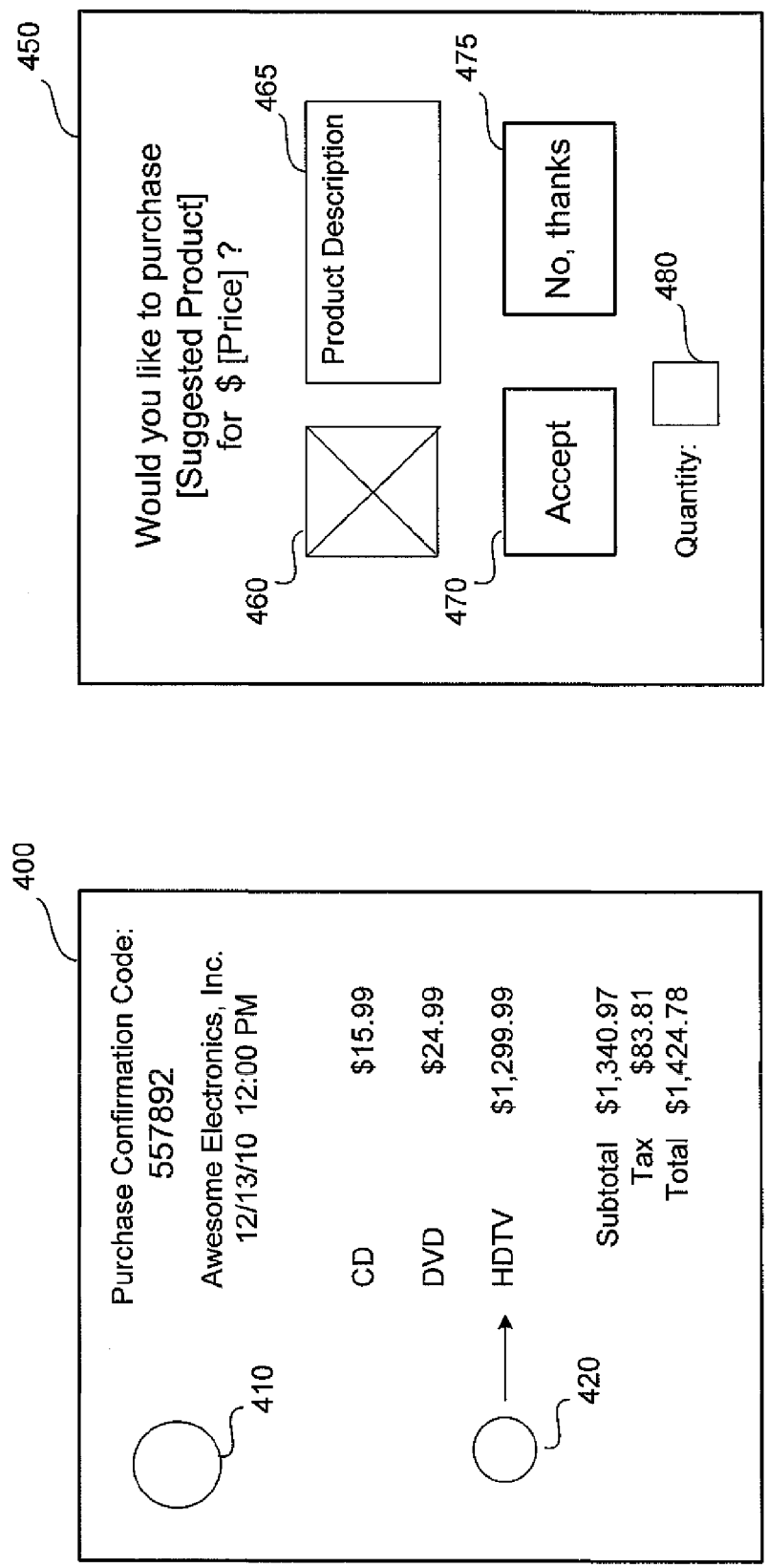
FIG. 3A is a block diagram illustrating an exemplary augmented receipt, in accordance with some embodiments of the present invention.
FIG. 3B is a block diagram illustrating an exemplary product suggestion, in accordance with some embodiments of the present invention.

FIG. 3A illustrates an exemplary purchase confirmation that may be generated by purchase facilitating server 160 and transmitted to one or more loss prevention devices and/or to mobile device 140 as an augmented receipt 400. Purchase confirmations may take any suitable form, as aspects of the present invention are not limited in this respect. As discussed above, in some embodiments, a receipt may be a text message or other electronic file or document identifying the one or more products that were purchased by the user via mobile device 140 in the retail establishment in the corresponding transaction. In some embodiments, the purchased products may be listed in the receipt by name and/or bar code number. In some embodiments, a purchase confirmation such as augmented receipt 400 may be received and displayed on mobile device 140 and/or on a loss prevention device operated by loss prevention personnel of the retail establishment.

As depicted, augmented receipt 400 includes some information conventionally included on receipts from retail establishments. For example, augmented receipt 400 lists, at the top left, the name of the retail establishment or its associated retail merchant ("Awesome Electronics, Inc."), as well as the date and time that the transaction was processed (Dec. 13, 2010 at 12:00 pm). For each product purchased in the transaction, augmented receipt 400 lists, in the body of the document, the name of the product and its price. In this case, the user purchased a compact disc (CD) for $15.99, a digital versatile disc (DVD) for $24.99, and a high definition television (HDTV) for $1,299.99. Augmented receipt 400 also lists, at the bottom, the purchase subtotal ($1,340.97, the sum of the individual prices of the purchased products), the sales tax applied ($83.81), and the total monetary amount transacted ($1,424.78, the sum of the subtotal and the tax).

In addition, augmented receipt 400 lists a purchase confirmation code (557892) for the transaction. As discussed above, such a purchase confirmation code may be of any suitable form, such as any suitable sequence of numbers, letters and/or other characters and/or symbols. In some embodiments, a purchase confirmation code may be a unique identifier for a receipt and its associated transaction, and loss prevention personnel may check the purchase confirmation code on augmented receipt 400 to confirm that it matches between mobile device 140 and the loss prevention device. Also, in some embodiments, a receipt's purchase confirmation code may be regenerated after the user is cleared by loss prevention personnel, as discussed above.

Augmented receipt 400 also includes an overall visual indicator 410 indicative of an estimated likelihood of theft associated with the transaction represented by augmented receipt 400. On augmented receipt 400, visual indicator 410 is depicted as a circle; however, it should be appreciated that this is merely one example of a suitable visual indicator. Visual indicators may take any suitable form, including a variety of shapes, colors, shadings, patterns, icons, graphics, text, symbols, and/or other indicator types, as aspects of the present invention are not limited in this respect. In some embodiments, visual indicators such as visual indicator 410 may be color coded to represent various levels of estimated likelihood of theft. In some embodiments, loss prevention personnel may take note of visual indicator 410 on augmented receipt 400 to determine to what extent the products in the user's physical cart should be inspected to make sure that they match the list of products on augmented receipt 400.

Exemplary augmented receipt 400 also includes another visual indicator 420 associated with a particular product listed on augmented receipt 400, in this case the HDTV. As discussed above, in some embodiments, particular individual products, for instance products of high value, may be specifically flagged with a visual indicator to instruct loss prevention personnel to inspect those specific products with increased vigilance. In this example, the HDTV may have been flagged with visual indicator 420 because it is much higher in price and/or value than the other two products listed on augmented receipt 400, and it may be particularly important for the loss prevention personnel to confirm that the corresponding item in the user's physical cart is indeed the same product that was legitimately purchased and reflected on augmented receipt 400. In some embodiments, product-specific visual indicators such as visual indicator 420 may be of similar form to overall visual indicators such as visual indicator 410. In one example, a green-yellow-red color coding scheme as discussed above may be used to signify different extents to which overall shopping carts should be inspected, and may also be used to signify different extents to which individual items should be inspected. However, in some embodiments, a product-specific visual indicator such as visual indicator 420 need not be of the exact same color and/or form as the overall visual indicator on the same augmented receipt, such as visual indicator 410 on augmented receipt 400. For instance, in one example, overall visual indicator 410 may be yellow to indicate that some, but not all, items in the user's physical cart should be inspected; whereas specific visual indicator 420 may be red to indicate that the HDTV should be inspected with great care. However, it should be appreciated that the form of specific visual indicators may have any suitable relationship to the form of overall visual indicators, including no relationship at all, as aspects of the present invention are not limited in this respect.

Furthermore, it should be appreciated that augmented receipt 400 is merely one example of an augmented receipt that may be generated in accordance with some embodiments of the present invention. Augmented receipts are not limited to inclusion of any of the information, text, graphics, visual indicators, or other items depicted on augmented receipt 400; neither are augmented receipts limited to the specific wording of items depicted on augmented receipt 400. Also, any other suitable items not depicted in augmented receipt 400 may be added in some embodiments to an augmented receipt, as aspects of the present invention are not limited in this respect. In addition, it should be appreciated that an augmented receipt such as exemplary augmented receipt 400 need not be represented in the same form on all devices in the system or at all times when it is used and/or viewed. For example, as discussed above, in some embodiments purchase facilitating server 160 may transmit an augmented receipt in different forms to a user's mobile device and to devices at the retail establishment.

The inventors have appreciated that when a shopper uses his mobile phone or other mobile device to obtain product information and/or to purchase products while in a retail establishment, an opportunity is presented to offer product suggestions or offers to the shopper based on the items that the user has viewed/scanned, selected for purchase, and/or purchased, and/or to customize offers or product suggestions for individual shoppers based on other information about the shopper. This gives retail establishments an opportunity to increase sales by offering shoppers add-on products or other products that the shopper likely may be interested in. In some embodiments, purchase facilitating server 160 may be in communication with an offer server 170, in which various offers from manufacturers and/or retailers may be stored in association with products offered for sale by the retail establishment. Although purchase facilitating server 160 and offer server 170 are depicted as separate servers in the exemplary operating environment illustrated in FIG. 1, it should be appreciated that the functionality of purchase facilitating server 160 and offer server 170 may also be integrated together on one server or other computing device, as aspects of the present invention are not limited in this respect. In some embodiments, a manufacturer or retailer may purchase or bid on offer space on offer server 170 so that an offer from the manufacturer may be displayed to the user when the user scans the UPC label 130 of the associated product. In some embodiments, when purchase facilitating server 160 receives the image of UPC label 130 (or the corresponding product identifier) from mobile device 140, it may retrieve an offer associated with product 120 from offer server 170. Purchase facilitating server 160 may transmit this offer in addition to the product information for product 120 to mobile device 140, such that the offer may be displayed to the user on a display of mobile device 140. If the user decides to accept the offer, purchase facilitating server 160 may transact the user's purchase of the products offered in the offer and include those products in the receipt transmitted to the mobile device 140 and the inventory server 180. If the offer is to replace product 120 with a different product being suggested, the user's acceptance of the offer may cause product 120 to be removed from the user's electronic cart, and replaced by the suggested product.

In some embodiments, offer server 170 may store, in one or more computer-readable storage media, a data set listing, for each of one or more products offered for sale by the retail establishment, one or more offers that could be triggered by the user's selection of that product via mobile device 140. In some embodiments, each offer associated in the data set with a triggering product may also have a corresponding bid listed in the data set. In some embodiments, the bid for an offer may represent an amount that the supplier of that offer (e.g., a manufacturer or retailer of a product being suggested by the offer) will pay if the offer is selected to be transmitted to mobile device 140 in response to the user's selection of the triggering product for potential purchase. In some embodiments, when the user makes such a selection of the triggering product, purchase facilitating server 160 may look up the triggering product in the data set of offer server 170, and may retrieve the offer with the current highest bid associated with the triggering product. This offer may then be transmitted to mobile device 140 for the user's consideration.

Offers may be of any suitable form, as aspects of the present invention are not limited in this respect. In some embodiments, an offer may be a textual message capable of being displayed to the user upon being transmitted to mobile device 140. In some embodiments, an offer may also include one or more images, such as thumbnails, of one or more products being suggested by the offer, and/or may include any other suitable visible items, as aspects of the present invention are not limited in this respect. In some embodiments, the text and/or graphics of an offer may be created by the manufacturer, retailer, advertiser or other entity who supplies the offer to offer server 170. In this respect, in some embodiments offer server 170 may receive offer data through a web interface with which manufacturers, retailers and other offer suppliers may interact. In some embodiments, such a web interface may allow offer suppliers, through network connections from their own computing devices, to create text and/or graphics for an offer, submit a bid for the offer on one or more triggering products, and/or specify other preferences such as a particular type of user to which they would like the offer to be sent (e.g., a user new to the retail establishment, a user of a certain age or gender, etc.), a particular time of day or day of the week in which they would like the offer to be sent, etc.

One example of a type of offer that may be found on offer server 170 is an upselling offer for a product that competes with the product triggering the offer. For example, a television manufacturer may create an offer suggesting the purchase of a television at a certain price, and could list that offer on offer server 170 with another manufacturer's more expensive television as a triggering product. Then, when a user scans the more expensive television for potential purchase (e.g., via image recognition of the television's bar code), if the offer for the cheaper competing television has the highest bid, it may be transmitted to the user's mobile device. If the user then accepts the offer through any suitable user input, the product identifier for the more expensive television may be removed from the user's electronic cart and replaced by the product identifier for the competing television from the offer.

Another type of offer is a bundling offer for a product that complements the product triggering the offer. For example, a manufacturer of memory cards may bid to have its offer displayed to users purchasing digital cameras. When a user scans a digital camera for potential purchase, the manufacturer's offer could be transmitted to the user's mobile device as a suggestion that the memory card would be a useful accessory. If the user accepts the offer, the product identifier for the memory card may be added to the user's electronic cart. In the case of such a bundling offer, in some embodiments the original scanned product identifier (e.g., the bar code number for the digital camera) may not be removed from the electronic cart unless the user requests it. Both the triggering product and the suggested product may be listed in the electronic cart together, as they are meant to bundle with and complement each other, and do not compete with each other.

In some embodiments, one or more offers to be displayed on a user's mobile device in response to the scanning of a triggering product may not be selected based solely on the bids associated with the offers, but may alternatively or additionally be selected based on an estimation of which offer may be most attractive to the user in question. In some embodiments, purchase facilitating server 160 may make such an estimation using stored data indicating which offers were accepted by which users in the past. Based on the current user's past purchase history and/or stored profiling information, in some embodiments purchase facilitating server 160 may determine a class of users to which the current user is most similar, and may select an offer to transmit to the current user based at least in part on the offers that users of that class have accepted in the past.

In some embodiments, other types of product suggestions may be made to users via their mobile devices, without reference to specific offers provided in relation to specific triggering products. For instance, in some embodiments, purchase facilitating server 160 may make product suggestions based on one or more items that the user has already scanned for potential purchase from the retail establishment, by formulating a hypothesis as to a specific purpose for which the user is purchasing those items. In some embodiments, purchase facilitating server 160 may formulate such a hypothesis by matching one or more products in the user's electronic cart with a known set of products that is useful for that particular purpose, and that includes one or more products that the user has not yet scanned. Some examples of sets of products that are useful for such a particular purpose may include, but are not limited to, a set of ingredients listed in a cooking recipe, a set of tools and/or materials useful for a particular home improvement project or do-it-yourself task, a complete set of items requested in a gift registry, etc. In one example, for instance, once a user has added carrots, flour, sugar and eggs to her electronic cart within a grocery store, purchase facilitating server 160 may determine that it is likely that the user is collecting ingredients in a recipe for making carrot cake, and may transmit a product suggestion to the user's mobile device to remind her to also purchase baking soda as part of the recipe.

In some embodiments, purchase facilitating server 160 may make such product suggestions with reference to a data set of various known sets of products, being offered for sale by retail establishments, with the members of each set being useful together for a particular purpose, such as a recipe or do-it-yourself kit. The data set may be stored within purchase facilitating server 160, within offer server 170, and/or in one or more other computer-readable storage media separately accessible to purchase facilitating server 160. Such a data set, or another separate data set, may also store past purchase data of one or more users, to aid in determining one or more best matches between products currently scanned in a user's electronic cart and one or more established product sets stored in the data set.

In some embodiments, products currently in the user's electronic cart may be matched to a known product list based at least in part on the user's own past purchase history. For example, if the user has purchased a similar collection of products fitting the carrot cake recipe in the past, purchase facilitating server 160 may with high confidence match the user's current incomplete electronic cart to the appropriate product set for the recipe, and may provide product suggestions for the remaining products in the recipe. In some embodiments, information such as the order in which the user has previously selected items within the retail establishment for purchase, product offers the user has considered while shopping in the past, products the user has actually purchased in the past, the number of previous times the user has visited the retail establishment, the frequency of the user's visits to the retail establishment, the total monetary amount and average monetary amounts of the user's past purchases, etc. (collectively, the user's "shopping history"), may be used in predicting product suggestions that the user is likely to accept in the current shopping visit. Also, in some embodiments, the contents of the user's electronic cart may be matched to one or more product lists based at least in part on statistical data gathered from other users' past purchases. For example, if the current user's electronic cart contains three products, and a large percentage of past users who purchased those three products also purchased a particular fourth product within the same visit to a retail establishment, then purchase facilitating server 160 may suggest that fourth product to the current user. In some embodiments, purchase facilitating server 160 may compare profiling information for the current user to that of other users to determine a class of user to which the current user belongs, and may formulate product suggestions with reference to statistical data taken from that class of user. In some embodiments, one or more statistical models (some exemplary types of which were given above) may be trained on available profiling information and past purchase history to determine likely matches between known product sets and the user's current electronic cart.

In some embodiments, purchase facilitating server 160 may use user feedback to refine the matches it makes between users' incomplete electronic shopping carts and known sets of products useful for particular purposes. For example, when purchase facilitating server 160 determines that the current user may be collecting ingredients for a carrot cake recipe, in some embodiments purchase facilitating server 160 may transmit to the user's mobile device a query inviting confirmation, such as, "It looks like you are collecting ingredients for a carrot cake. Would you like help?" Such a query may be displayed on the user's mobile device in the form of a text message, a pop-up window, or in any other suitable form. If the user selects, "Yes," then the recipe hypothesis may be confirmed, and the association between the current contents of the user's electronic cart and the carrot cake recipe may be strengthened in the appropriate statistical models and data sets for use in determining future product suggestions. Also, in some embodiments, purchase facilitating server 160 may transmit product suggestions to the mobile device, for one or more products in the carrot cake recipe that are not currently in the electronic cart. In some embodiments, if the user accepts any of the product suggestions, the corresponding product identifiers may be added to the user's electronic cart.

In other embodiments, user feedback may be obtained through different types of prompts and interactions via the user's mobile device. For example, if purchase facilitating server 160 determines from a user's current electronic cart contents that it is likely the user is collecting ingredients either to make biscuits or to make dinner rolls, purchase facilitating server 160 may then in some embodiments transmit multiple discriminating product suggestions to the user's mobile device. An example of such product suggestions might be, "If you are planning to make biscuits, buy shortening. If you are planning to make dinner rolls, buy yeast." By observing which product suggestion the user accepts or follows, the statistical data for the winning association may then be strengthened for future matches. In another example, purchase facilitating server 160 might simply transmit one product suggestion in accordance with the most likely hypothesis of a product set matching the user's electronic cart, and subsequent data as to whether the user accepts or rejects the product suggestion may be used to refine future matches.

In the examples above, recipes are used as examples of known lists of products to which items in a user's electronic cart are prepared. However, this technique may be applied to any of a variety of types of lists of items including, for example, lists of items for home improvement projects, lists of items for building an electronic system (e.g., a home theater system), or lists of items for any other project or task.

In some embodiments, when an offer or other product suggestion is transmitted to a user's mobile device within a retail establishment, by any of the processes described above, purchase facilitating server 160 may apply a variable discount to the product suggestion, and the user may receive the discount on the suggested product if the user accepts the product suggestion. In some embodiments, the amount of such a discount may be defined by the retail merchant, for example in accordance with rules that give different discounts to different classes of users (e.g., greater discounts for users that are new to the retail establishment). In some embodiments, however, purchase facilitating server 160 may compute an amount of a discount that should be applied to successfully entice the user in question to accept the product suggestion. In some embodiments, purchase facilitating server 160 may perform such a computation with reference to any available data relevant to the user's purchasing tendencies, such as the user's profiling information and/or past purchase history, and/or such information for other users similar to the current user (e.g., of a same class of user).

In some embodiments, when a user accepts a product suggestion received from purchase facilitating server 160 and displayed on the user's mobile device, purchase facilitating server 160 may also transmit to the mobile device a map of the retail establishment or of a portion of the retail establishment, showing where the suggested product can physically be found. Then, when the user arrives at the suggested product's location in the retail establishment, in some embodiments the user may scan the suggested product's bar code, and a confirmation of whether the user in fact found the correct suggested product may be displayed on the mobile device. In some embodiments, product suggestions may be provided based at least in part on the user's current location in the retail establishment (e.g., as determined from the mobile device's GPS capabilities, or as determined by triangulation from a set of nearby wireless access points), such that suggestions for nearby products are offered for the user's consideration before suggestions for products that are farther away. Accordingly, in some embodiments, the user may be guided in an efficient route through the retail establishment, filling the user's electronic cart with product identifiers by scanning physical products and accepting electronic product suggestions, while concurrently filling the user's physical shopping cart with the corresponding physical products from the retail establishment.

FIG. 3B illustrates an exemplary product suggestion/offer that may be generated by purchase facilitating server 160 based on an association with one or more products already scanned by the user of mobile device 140, and may be transmitted by purchase facilitating server 160 to be displayed on mobile device 140. As discussed above, product suggestions displayable on mobile device 140 may take any suitable form, as aspects of the present invention are not limited in this respect. In some embodiments, a product suggestion may be a textual message, or may include one or more images and/or other suitable visible items, and may appear on a display of mobile device 140 as part of the electronic shopping cart window, or as a separate pop-up window, or in any other suitable way.

As depicted in FIG. 3B, exemplary product suggestion 450 includes, at the top, a textual query, "Would you like to purchase [Suggested Product] for $[Price]?" that communicates the product suggestion to the user of mobile device 140. In this exemplary query, the placeholder "[Suggested Product]" may be replaced by the name of a particular product being suggested, and the placeholder "[Price]" may be replaced by the suggested product's price, optionally with any discount applied for this offer to this particular user. Product suggestion 450 also includes a thumbnail image 460 of the suggested product, as well as a textual product description 465, to inform the user about the suggested product so the user may consider whether or not to purchase it.

In this example, the user may accept the product suggestion by pressing, clicking on, or otherwise submitting user input to select acceptance button 470, labeled "Accept". In some embodiments, as discussed above, selecting acceptance button 470 may cause the application program on mobile device 140 to add the suggested product to the user's electronic shopping cart. In some embodiments, the user may specify a number of units of the suggested product to add to the electronic shopping cart, for instance by inputting a number into "Quantity" box 480. In some embodiments, this function may allow the user to add multiple units of the suggested product at once to the list for purchase, by accepting the product suggestion. If the user decides not to accept product suggestion 450, the user may select rejection button 475, labeled "No, thanks". In some embodiments, selecting rejection button 475 may remove product suggestion 450 from the display of mobile device 140, without adding any units of the suggested product to the user's electronic cart. It should be appreciated, however, that the user's acceptance or rejection of a product suggestion may be communicated in any suitable way, as aspects of the present invention are not limited in this respect.

Furthermore, it should be appreciated that product suggestion 450 is merely one example of a product suggestion that may be generated in accordance with some embodiments of the present invention. Product suggestions are not limited to inclusion of any of the information, text, images, graphics, or other items depicted in product suggestion 450; neither are product suggestions limited to the specific wording of items depicted in product suggestion 450. Also, any other suitable items not depicted in product suggestion 450 may be added in some embodiments to a product suggestion, as aspects of the present invention are not limited in this respect.

Figure 4A:
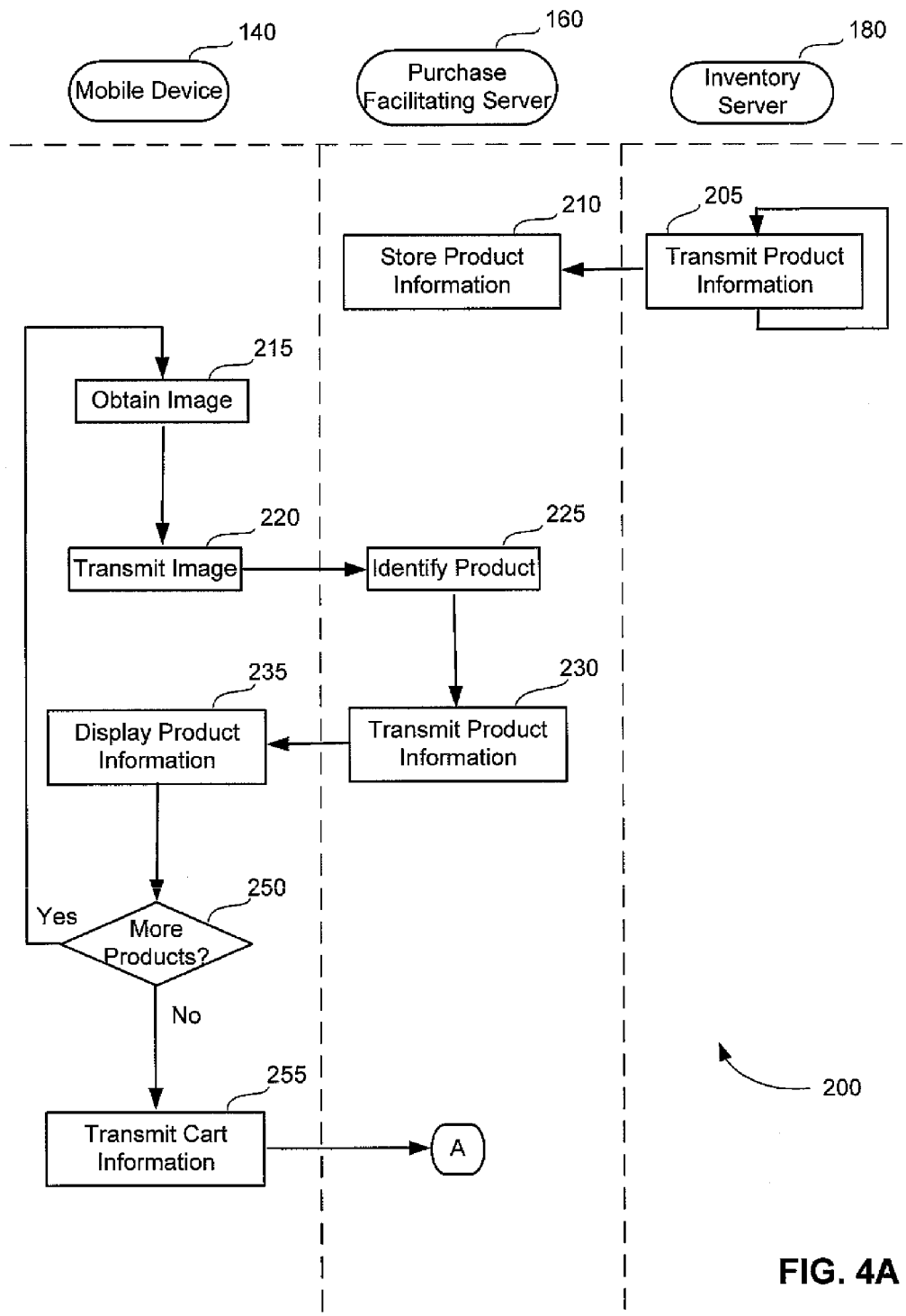
FIGS. 4A and 4B, when connected at the points labeled "A", form a flowchart illustrating an exemplary process for purchasing products from a retail establishment using a mobile device, in accordance with some embodiments of the present invention.
Figure 4B:
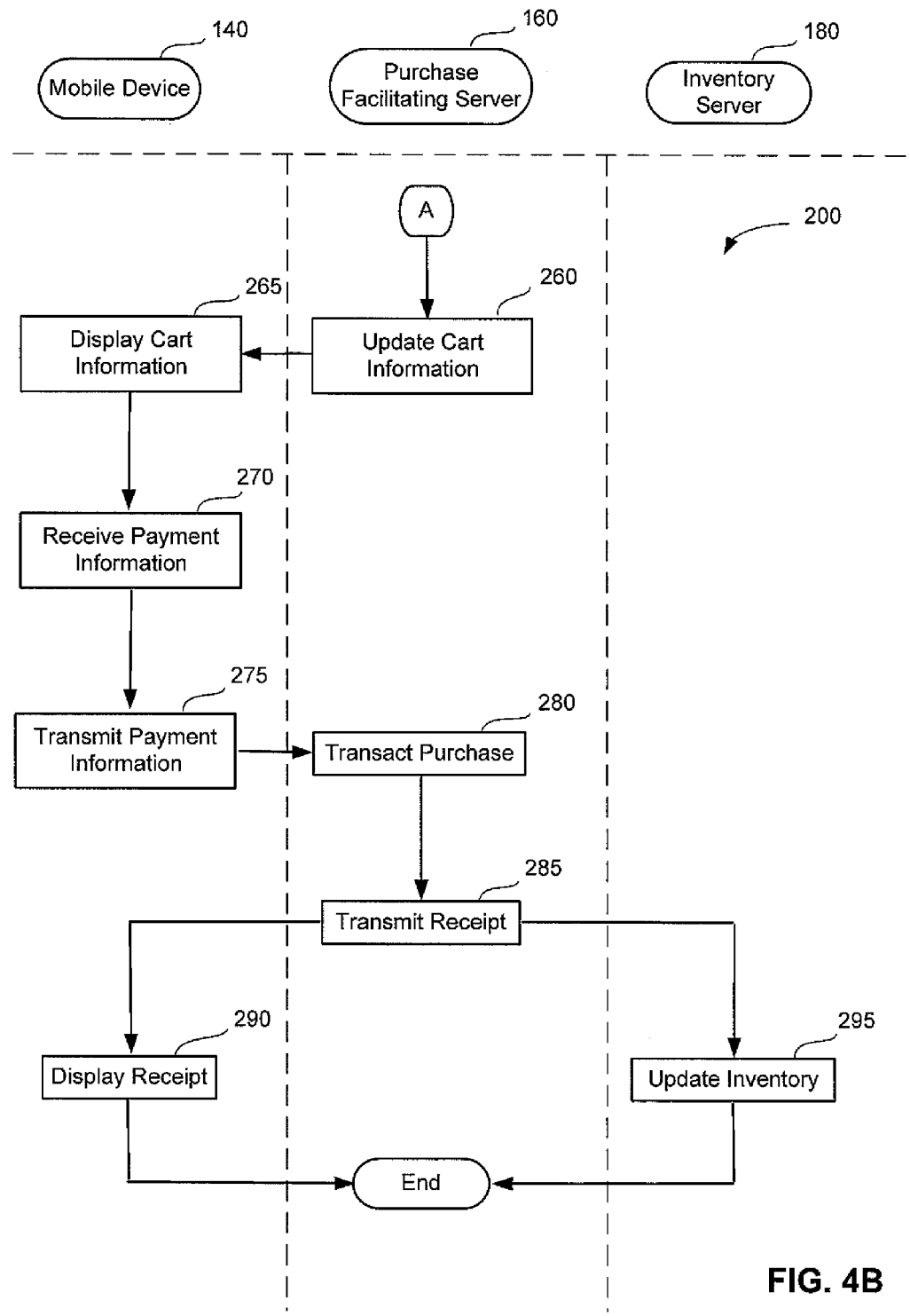

FIGS. 4A and 4B, when connected at the points labeled "A", form a flowchart illustrating an exemplary process 200 for purchasing products from a retail establishment using a mobile device, in accordance with some embodiments of the present invention. Process 200 begins at act 205, in which inventory server 180 transmits to purchase facilitating server 160 information pertaining to products being offered for sale by the retail establishment. For example, in some embodiments inventory server 180 may operate a data feed to transmit updated product information to purchase facilitating server 160, looping back to act 205 to transmit newly updated information at regular time intervals (e.g., every 30 seconds). In other embodiments, purchase facilitating server 160 may poll inventory server 180 at any suitable intervals to obtain updated product information. Product information may include an inventory of products currently offered for sale by the retail establishment, along with price information for each product. In some embodiments, product information may also include product names, product descriptions, product identifiers (e.g., bar code numbers), thumbnail images and/or any other appropriate information pertaining to products offered for sale. At act 210, purchase facilitating server 160 stores the product information received from inventory server 180, for example in a database of purchase facilitating server 160.

At act 215, a user may use the image acquisition component 150 of mobile device 140 to capture an image identifying a product that the user is considering purchasing, for example product 120. As discussed above, this image may be any image comprising information that identifies product 120, for example, an image of UPC label 130 affixed to product 120. The image may be captured while the user and the mobile device are within the retail establishment, in sufficient proximity to the product 120 being offered for sale in the retail establishment to capture an image of its UPC label 130. After act 215, the process continues to act 220, where mobile device 140 transmits the captured image to purchase facilitating server 160. The process then continues to act 225, where purchase facilitating server 160 processes the image received from mobile device 140 using an image recognition technique to identify the product 120 associated with the transmitted image. For example, UPC label 130 may be processed through image recognition to identify the UPC code represented by UPC label 130. The UPC code may provide a unique identifier for product 120. Any suitable image recognition technique may be used, as aspects of the present invention are not limited in this respect. Some examples of suitable image recognition techniques have been provided above. While such image recognition may in some embodiments be performed by purchase facilitating server 160, as discussed above the image recognition may in other embodiments be performed by mobile device 140.

Once purchase facilitating server 160 has identified product 120, the product information associated with product 120 may be retrieved, for example, from a database of purchase facilitating server 160 in which the product information received from inventory server 180 at act 205 is stored at act 210. The process then continues to act 230, where purchase facilitating server 160 transmits this product information to mobile device 140.

Purchase facilitating server 160 may also retrieve a product suggestion/offer associated with product 120. For example, purchase facilitating server 160 may communicate with an offer server 170 to retrieve the offer in connection with product 120. As described above with reference to FIG. 1, offer server 170 may store a number of manufacturer offers in association with products offered for sale by the retail establishment. Manufacturers and/or retailers may place bids on particular products to have offers associated with them. For example, a manufacturer may bid for an upselling offer, in which a user scanning a first product is presented with an offer for a second competing product at a competing price. In another example, a retailer may bid for a bundling offer, in which a user scanning a first product is presented with an offer for one or more other compatible products that the user may be attracted to purchase along with the first product. In other examples, as discussed above, a user having scanned one or more products may be presented with product suggestion(s) for one or more other products that, together with the already scanned products, belong to a known set of products useful for a particular purpose, such as a cooking recipe or a do-it-yourself kit.

In response to identifying a product, for example product 120, represented by an image received from mobile device 140 at act 225, purchase facilitating server 160 may retrieve from offer server 170 any offer (e.g., the offer with the highest bid for the product) associated with product 120, and/or may determine one or more otherwise appropriate product suggestions based on the user's scanning of product 120. At act 230, purchase facilitating server 160 may transmit the product information for product 120 to mobile device 140, as well as any associated offer/suggestion. The process next continues to act 235, where mobile device 140 may display the transmitted product information, and any offer/suggestion received, on a display of the mobile device, such that it can be viewed by the user. Product information for product 120 may include any of various information associated with product 120 being offered for sale by a retail establishment, including, but not limited to, price information and/or product description information. If an offer/suggestion has been displayed in association with the product information, mobile device 140 may receive user input indicating an acceptance or rejection of the offer displayed (e.g., by pressing an "Accept" or "No, thanks" button). If the offer is accepted, mobile device 140 may update the user's electronic shopping cart to include any products identified in the offer.

The process next continues to act 250, where mobile device 140 may receive user input indicating whether the user desires to add more products to the user's electronic shopping cart. In some embodiments, user input to add more products may simply include operation of mobile device 140 to capture a new bar code image. If more products are desired to be purchased, process 200 may return to act 215, at which another product UPC label may be scanned. If no more products are to be added, and the user desires to "check out" (e.g., if the user selects a "check-out" button), process 200 may continue to act 255, at which mobile device 140 may transmit stored UPC codes for all items in the user's electronic shopping cart (i.e., all products whose UPC labels have been scanned and selected by the user to be placed in the electronic shopping cart) to purchase facilitating server 160. The process then continues to act 260, where purchase facilitating server 160 may look up the received UPC codes to retrieve product information stored in the database of purchase facilitating server 160. That is, product information (including price information) retrieved at act 260 may have been updated from a recent loop of act 205 since the user scanned the products at act 215. Thus, at act 260, purchase facilitating server 160 may retrieve any updated product information. In addition, in some embodiments purchase facilitating server 160 may query inventory server 180 to confirm that the products to be purchased are still physically in stock at the retail establishment.

In act 260, updated price information for each product in the user's electronic shopping cart may be used to compute a total cost of the shopping cart. The total cost may be calculated to include such considerations as sales tax, any discounts to which the user is entitled from the retail establishment, and/or any discounts to which the user is entitled through use of the mobile device software application. For example, a retail establishment or other operator of purchase facilitating server 160 may provide a loyalty subscription, through which the user may be entitled to any of various discounts for use of the mobile device software application to purchase products in communication with purchase facilitating server 160. In some embodiments, purchase facilitating server 160 may be informed of the retail establishment's current discount programs through network communication with inventory server 180 and/or with another computing device associated with the retail establishment, and may then apply such discounts to the user's purchases.

The process then continues to act 265, where mobile device 140 may display updated shopping cart information received from purchase facilitating server 160. If the user desires to continue with the purchase, mobile device 140 may, at act 270, prompt the user for payment information and receive the payment information from user input, such as typing on a keypad or voice recognition. For example, payment information may include a credit card number, verification information, authorization information (e.g., a password) and/or any other information useful in transacting a credit card purchase. The process then continues to act 275, where mobile device 140 may transmit the input payment information to purchase facilitating server 160. Alternatively, in some embodiments, such payment information may already be stored in mobile device 140, in purchase facilitating server 160 and/or in one or more other suitable computer-readable storage media from which it may be automatically retrieved.

The process next continues to act 280, where purchase facilitating server 160 may use the received payment information to transact the user's purchase of the products in the user's electronic shopping cart from the retail establishment. For example, purchase facilitating server 160 may communicate with a credit card payment network (e.g., directly or via a third party) to transact a transfer of funds belonging to the user, in the amount of the total cost of the shopping cart, to an account of the retail establishment. The process next continues to act 285, where purchase facilitating server 160 may generate and transmit a receipt confirming the user's purchase to both mobile device 140 and inventory server 180.

The process then continues to act 295, where inventory server 180 may process the received receipt to update the inventory of the retail establishment to reflect a reduction in inventory count of the products purchased by the user. As discussed above, inventory server 180 may then store information contained in the receipt to be retrieved by loss prevention personnel at the physical retail establishment as the user exits the store.

In addition, after act 285, at act 290 mobile device 140 may display the receipt received from purchase facilitating server 160, such that the user may show the receipt on a display of mobile device 140 to loss prevention personnel at the retail establishment store. As the user exits the physical store with the products purchased in the transaction, loss prevention personnel may compare the receipt displayed on mobile device 140 to receipt information received at a loss prevention device. This may allow loss prevention personnel to validate the user's purchase of products identified by the receipt, and to prevent theft of items not identified in the receipt. In some embodiments, the receipt may be augmented with a visual indicator of an estimated likelihood of theft associated with the transaction, and the visual indicator may instruct the loss prevention personnel as to the extent of inspection that should be performed on the user's physical shopping cart prior to the user exiting the retail establishment.

In the exemplary method described above, the image recognition of an image of a bar code (e.g., a UPC code) or other product identifying information is performed by server 160. However, the invention is not limited in this respect, as the image recognition process may be performed on any suitable device in the system. For example, in some embodiments, rather than sending a captured image of a bar code to server 160 for image recognition, mobile device 140 may perform image recognition on the image that it captured to determine a product identifier number encoded in the bar code, and may send this product identifier to server 160 instead of, or in addition to, sending the image itself.

In some embodiments, the mobile device application may also be programmed to display general advertisements from the retail establishment on a display of mobile device 140 when the user enters the physical retail store. For example, the retail establishment may publish an electronic in-store circular (e.g., via server 160, server 180, or any other suitable way) that lists current promotions such as sales, discounts, new or best selling products, etc., for that particular store. The mobile device application may be programmed to determine when the user enters the retail establishment, for example using global positioning capabilities of the mobile device, and to display a current in-store circular advertisement at that time. The mobile device application may also be programmed to determine a particular section of the store in which the user is shopping, and to display advertisements specific to that section. Such advertisements may be received, in some embodiments, at mobile device 140 from purchase facilitating server 160.

In some embodiments, the mobile device application may also provide a social networking function, with individual user profiles that can be viewed by other users also having the purchase facilitating application program on their mobile devices. In some embodiments, various information may be automatically posted on a user's profile in the application in response to various shopping-related triggering events (subject to user authorization in some embodiments). For example, when a user transacts a purchase in a retail establishment using the application, in some embodiments information about the purchase may be posted on the user's profile. Such information may include, in some embodiments, identification of one or more products purchased, identification of prices of one or more products purchased, identification of the retail establishment at which the one or more products were purchased, and/or the date and/or time at which the purchase was transacted, etc. In some embodiments, a user's visits to a retail establishment may be posted on the user's profile, regardless of whether the user transacted a purchase there. In addition, in some embodiments, icons or other indicators may be posted on the user's profile when the user performs certain activities via the application which one or more retailers, manufacturers, advertisers and/or other parties would like to reward. For example, if a user spends over a threshold amount of money in a particular retail establishment within a certain amount of time, in some embodiments the user's profile may receive an achievement tag or other icon from that retail establishment. In another example, a user's profile may receive an achievement tag for physically visiting a certain number of branches of a retail merchant in a certain geographical area. In some embodiments, the user may be allowed to exchange such achievement tags for monetary rewards, such as gift certificates and/or discounts on future purchases. In some embodiments, retail merchants may also use such achievement tags, as well as other information posted on a user's application profile, to target particular users for promotions, based on knowledge of the user's shopping habits and likelihood of visiting particular retail establishments.

Figure 5B:
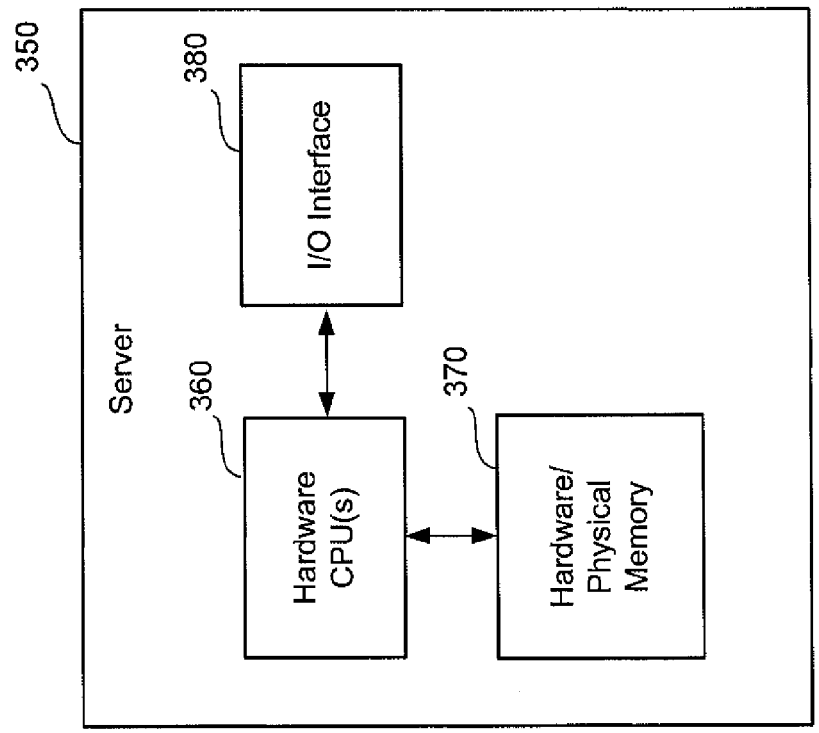
FIGS. 5A and 5B are block diagrams illustrating exemplary architectures for a mobile device and a server, respectively, in accordance with some embodiments of the present invention.
Figure 5A:
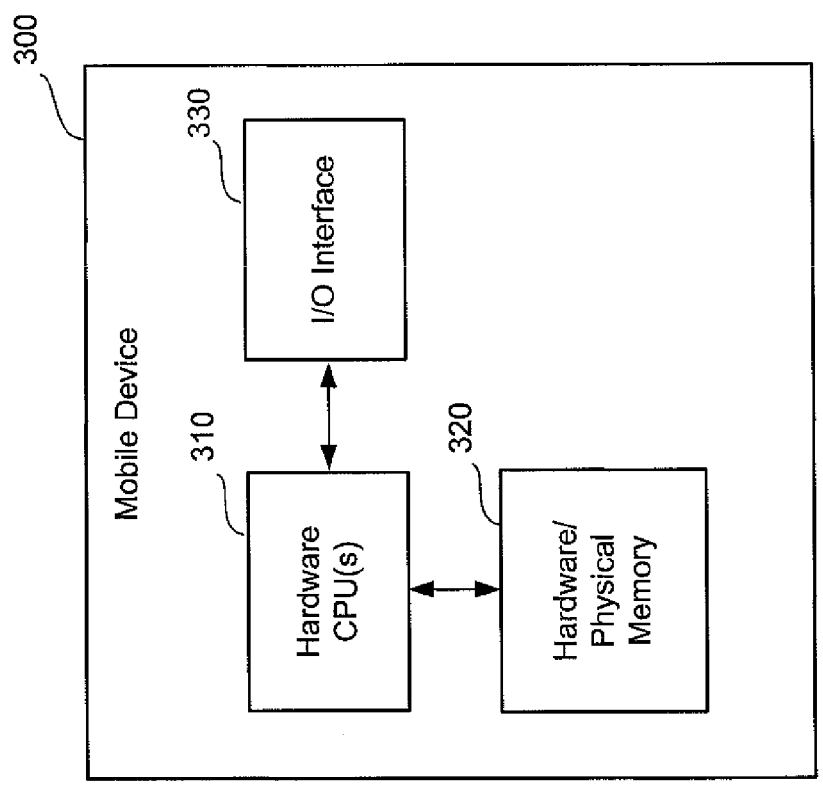

Mobile device 140 and servers 160, 170 and 180 may be implemented in any suitable way. FIGS. 5A and 5B respectively illustrate exemplary architectures for a mobile device 300 and a server 350 (for example, any of servers 160, 170 and 180) that may be used in some embodiments. Exemplary mobile device 300 comprises one or more hardware central processing unit(s) (CPU) 310, operatively connected to hardware/physical memory 320 and input/output (I/O) interface 330. Exemplary server 350 similarly comprises hardware CPU(s) 360, operatively connected to hardware/physical memory 370 and input/output (I/O) interface 380. Hardware/physical memory may include volatile and/or non-volatile memory. The memory may store one or more instructions to program the CPU to perform any of the functions described herein. The memory may also store one or more application programs. In this respect, the memory may serve as one or more computer-readable storage media (e.g., tangible, non-transitory computer-readable media) encoded with computer-executable instructions that, when executed, perform any of the functions described herein.

Exemplary mobile device 300 and exemplary server 350 may have one or more input and output devices. These devices can be used, among other things, to present a user interface and/or communicate (e.g., via a network) with other devices or computers. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Although examples provided herein have described servers 160, 170 and 180 as residing on separate computers, it should be appreciated that the functionality of these components can be implemented on a single computer, or on any larger number of computers in a distributed fashion.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible, non-transitory computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing, and the invention is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of transacting a user's purchase of one or more products from a retail establishment, the method performed, at least in part, by a computer system comprising at least one hardware processor, the method comprising:
   receiving an indication from a mobile device in the retail establishment to purchase the one or more products from the retail establishment, the indication comprising payment information for purchasing the one or more products;
   processing at least the payment information via at least one processor to transact the user's purchase of the one or more products from the retail establishment;
   prior to the user encountering a loss prevention device at the retail establishment, calculating an estimated likelihood of theft associated with the transaction, wherein calculating the estimated likelihood of theft comprises:
      defining, based on a user profile, a value for each of a plurality of user specific factors, wherein the user profile is generated prior to the user's purchase,
      mathematically combining the value and a weight defined for each of the plurality of user specific factors to obtain a contribution amount for each of the plurality of user specific factors, and
      mathematically combining the contribution amount of each of the plurality of user specific factors to obtain the estimated likelihood of theft;
   generating a purchase confirmation identifying the one or more products purchased by the user;
   transmitting the purchase confirmation and the estimated likelihood to the loss prevention device at the retail establishment; and
   based on the transmitted likelihood, facilitating a determination of loss prevention measures to be taken.

2. The method of claim 1, wherein the generating comprises including in the purchase confirmation a visual indicator of the estimated likelihood of theft associated with the transaction.

3. The method of claim 2, wherein the visual indicator indicates an extent to which one or more products that the user intends to remove from the retail establishment are to be visually inspected by loss prevention personnel to confirm that the one or more products to be removed are represented in the purchase confirmation.

4. The method of claim 3, wherein the visual indicator indicates the extent of inspection by color coding.

5. The method of claim 1, wherein the user profile comprises information related to past purchases of the user, and wherein the plurality of user specific factors comprises an amount of deviation between the user's purchase and past purchases of the user.

6. The method of claim 1, wherein the act of calculating the estimated likelihood of theft further comprises identifying the user based on information received from the mobile device.

7. The method of claim 1, wherein the user profile comprises a history of results of comparisons between purchase confirmations and products the user has attempted to remove from the retail establishment.

8. The method of claim 1, wherein the contribution amount of each of the plurality of user specific factors is further mathematically combined with a contribution amount calculated for the one or more products identified in the purchase confirmation.

9. The method of claim 1, wherein the plurality of user specific factors comprises a length of time that the user and the mobile device were within the retail establishment prior to the transaction.

10. The method of claim 1, wherein the plurality of user specific factors comprises the user's level of interaction with the mobile device while within the retail establishment.

11. The method of claim 1, wherein the contribution amount of each of the plurality of user specific factors is further mathematically combined with a contribution amount calculated for a location of the retail establishment.

12. The method of claim 1, further comprising storing the purchase confirmation as part of the user profile.

13. At least one non-transitory computer-readable storage medium encoded with a plurality of computer-executable instructions that, when executed, perform a method of transacting a user's purchase of one or more products from a retail establishment, the method comprising:
   receiving an indication from a mobile device in the retail establishment to purchase the one or more products from the retail establishment, the indication comprising payment information for purchasing the one or more products;
   processing at least the payment information to transact the user's purchase of the one or more products from the retail establishment;
   prior to the user encountering a loss prevention device at the retail establishment, calculating an estimated likelihood of theft associated with the transaction, wherein calculating the estimated likelihood of theft comprises:
      defining, based on a user profile, a value for each of a plurality of user specific factors, wherein the user profile is generated prior to the user's purchase
      mathematically combining the value and a weight defined for each of the plurality of user specific factors to obtain a contribution amount for each of the plurality of user specific factors, and
      mathematically combining the contribution amount of each of the plurality of user specific factors to obtain the estimated likelihood of theft;
   generating a purchase confirmation identifying the one or more products purchased by the user; and
   transmitting the purchase confirmation and the estimated likelihood to the loss prevention device at the retail establishment.

14. The at least one non-transitory computer-readable storage medium of claim 13, wherein the generating comprises including in the purchase confirmation a visual indicator of the estimated likelihood of theft associated with the transaction.

15. The at least one non-transitory computer-readable storage medium of claim 14, wherein the visual indicator indicates an extent to which one or more products that the user intends to remove from the retail establishment are to be visually inspected by loss prevention personnel to confirm that the one or more products to be removed are represented in the purchase confirmation.

16. The at least one non-transitory computer-readable storage medium of claim 15, wherein the visual indicator indicates the extent of inspection by color coding.

17. The at least one non-transitory computer-readable storage medium of claim 13, wherein the user profile profiling information comprises information related to past purchases of the user, and wherein the plurality of user specific factors comprises an amount of deviation between the user's purchase and past purchases of the user.

18. The at least one non-transitory computer-readable storage medium of claim 13, wherein the act of calculating the estimated likelihood of theft further comprises identifying the user based on information received from the mobile device.

19. The at least one non-transitory computer-readable storage medium of claim 13, wherein the user profile comprises a history of results of comparisons between purchase confirmations and products the user has attempted to remove from the retail establishment.

20. The at least one non-transitory computer-readable storage medium of claim 13, wherein the contribution amount of each of the plurality of user specific factors is further mathematically combined with a contribution amount calculated for act of determining the estimated likelihood of theft is based at least in part on the one or more products identified in the purchase confirmation.

21. The at least one non-transitory computer-readable storage medium of claim 13, wherein the plurality of user specific factors comprises_act of determining the estimated likelihood of theft is based at least in part on a length of time that the user and the mobile device were within the retail establishment prior to the transaction.

22. The at least one non-transitory computer-readable storage medium of claim 13, wherein the plurality of user specific factors comprises the user's level of interaction with the mobile device while within the retail establishment.

23. The at least one non-transitory computer-readable storage medium of claim 13, wherein the contribution amount of each of the plurality of user specific factors is further mathematically combined with a contribution amount calculated for act of determining the estimated likelihood of theft is based at least in part on a location of the retail establishment.

24. The at least one non-transitory computer-readable storage medium of claim 13, wherein the method further comprises storing the purchase confirmation in the user profile.

25. A system comprising:
at least one hardware processor; and
at least one memory storing processor-executable instructions that, when executed by the
at least one processor, perform a method of transacting a user's purchase of one or more products from a retail establishment, the method comprising:
receiving an indication from a mobile device in the retail establishment to purchase the one or more products from the retail establishment, the indication comprising payment information for purchasing the one or more products;
processing at least the payment information to transact the user's purchase of the one or more products from the retail establishment;
prior to the user encountering a loss prevention device at the retail establishment, calculating an estimated likelihood of theft associated with the transaction, wherein calculating the estimated likelihood of theft comprises:
defining, based on a user profile, a value for each of a plurality of user specific factors, wherein the user profile is generated prior to the user's purchase,
mathematically combining the value and a weight defined for each of the plurality of user specific factors to obtain a contribution amount for each of the plurality of user specific factors, and
mathematically combining the contribution amount of each of the plurality of user specific factors to obtain the estimated likelihood of the;
generating a purchase confirmation identifying the one or more products purchased by the user; and
transmitting the purchase confirmation and the estimated likelihood to the loss prevention device at the retail establishment.

26. The system of claim 25, wherein the generating comprises including in the purchase confirmation a visual indicator of the estimated likelihood of theft associated with the transaction.

27. The system of claim 26, wherein the visual indicator indicates an extent to which one or more products that the user intends to remove from the retail establishment should be inspected to confirm that the one or more products to be removed are represented in the purchase confirmation.

28. The system of claim 27, wherein the visual indicator indicates the extent of inspection by color coding.

29. The system of claim 25, wherein the user profile information related to past purchases of the user, and wherein the plurality of user specific factors comprises an amount of deviation between the user's purchase and past purchases of the user.

30. The system of claim 25, wherein the act of calculating the estimated likelihood of theft further comprises identifying the user based on information received from the mobile device.

31. The system of claim 25, wherein the user profile comprises a history of results of comparisons between purchase confirmations and products the user has attempted to remove from the retail establishment.

32. The system of claim 25, wherein the contribution amount of each of the plurality of user specific factors is further mathematically combined with a contribution amount calculated for the one or more products identified in the purchase confirmation.

33. The system of claim 25, wherein the plurality of user specific factors comprises a length of time that the user and the mobile device were within the retail establishment prior to the transaction.

34. The system of claim 25, wherein the plurality of user specific factors comprises the user's level of interaction with the mobile device while within the retail establishment.

35. The system of claim 25, wherein the contribution amount of each of the plurality of user specific factors is further mathematically combined with a contribution amount calculated for a location of the retail establishment.

36. The system of claim 25, wherein the method further comprises storing the purchase confirmation as part of the user profile.

37. A method of purchasing one or more products from a retail establishment, the method being implemented in part on a mobile device comprising at least one hardware processor, the method comprising:
receiving, at the mobile device, input from a user of the mobile device, the input comprising an indication to purchase one or more products and payment information for purchasing the one or more products;
transmitting the payment information from the mobile device to a purchase facilitating service provider;

receiving at the mobile device, in response to transmitting the payment information, a purchase confirmation code from the purchase facilitating service provider;

receiving, at the mobile device and prior to the user encountering loss prevention personnel, an estimated likelihood of theft associated with the purchase, wherein the estimated likelihood of theft is calculated, at least in part, by:

defining, based on a user profile, a value for each of a plurality of user specific factors, wherein the user profile is generated prior to the user's purchase, mathematically combining the value and a weight defined for each of the plurality of user specific factors to obtain a contribution amount for each of the plurality of user specific factors, and mathematically combining the contribution amount of each of the plurality of user specific factors to obtain the estimated likelihood of theft;

communicating the purchase confirmation code and the estimated likelihood to the loss prevention personnel prior to the user removing the one or more products from the retail establishment; and based on the estimated likelihood, facilitating a determination of loss prevention measures to be taken.

38. The method of claim 37, wherein the communicating comprises displaying the purchase confirmation code for the loss prevention personnel on a display of the mobile device.

39. The method of claim 37, wherein the communicating comprises transmitting the purchase confirmation code from the mobile device to a device operated by the loss prevention personnel.

40. The method of claim 37, further comprising receiving, at the mobile device, a replacement purchase confirmation code from the purchase facilitating service provider after the communicating.

41. At least one non-transitory computer-readable storage medium in a mobile device encoded with a plurality of computer-executable instructions that, when executed by a processor of the mobile device, perform a method of purchasing one or more products from a retail establishment, the method comprising:

receiving, at the mobile device, input from a user of the mobile device, the input comprising an indication to purchase the one or more products and payment information for purchasing the one or more products;

transmitting the payment information from the mobile device to a purchase facilitating service provider;

receiving at the mobile device, in response to transmitting the payment information, a purchase confirmation code from the purchase facilitating service provider; receiving, at the mobile device and prior to the user encountering loss prevention personnel, an estimated likelihood of theft associated with the purchase, wherein the estimated likelihood of theft is calculated, at least in part, by:

defining, based on a user profile, a value for each of a plurality of user specific factors, wherein the user profile is generated prior to the user's purchase, mathematically combining the value and a weight defined for each of the plurality of user specific factors to obtain a contribution amount for each of the plurality of user specific factors, and mathematically combining the contribution amount of each of the plurality of user specific factors to obtain the estimated likelihood of theft; and communicating the purchase confirmation code and the estimated likelihood to the loss prevention personnel prior to the user removing the one or more products from the retail establishment.

42. The at least one non-transitory computer-readable storage medium of claim 41, wherein the communicating comprises displaying the purchase confirmation code for the loss prevention personnel on a display of the mobile device.

43. The at least one non-transitory computer-readable storage medium of claim 41, wherein the communicating comprises transmitting the purchase confirmation code from the mobile device to a device operated by the loss prevention personnel.

44. The at least one non-transitory computer-readable storage medium of claim 41, wherein the method further comprises receiving, at the mobile device, a replacement purchase confirmation code from the purchase facilitating service provider after the communicating.

45. A mobile device comprising: at least one processor; and at least one memory storing processor-executable instructions that, when executed by the at least one processor, perform a method of purchasing one or more products from a retail establishment, the method comprising:

receiving input from a user of the mobile device, the input comprising an indication to purchase the one or more products and payment information for purchasing the one or more products;

transmitting the payment information from the mobile device to a purchase facilitating service provider;

receiving at the mobile device, in response to transmitting the payment information, a purchase confirmation code from the purchase facilitating service provider;

receiving, at the mobile device and prior to the user encountering loss prevention personnel, an estimated likelihood of theft associated with the purchase, wherein the estimated likelihood of theft is calculated, at least in part, by:

defining, based on a user profile, a value for each of a plurality of user specific factors, wherein the user profile is generated prior to the user's purchase, mathematically combining the value and a weight defined for each of the plurality of user specific factors to obtain a contribution amount for each of the plurality of user specific factors, and mathematically combining the contribution amount of each of the plurality of user specific factors to obtain the estimated likelihood of theft; and communicating the purchase confirmation code and the estimated likelihood to the loss prevention personnel prior to the user removing the one or more products from the retail establishment.

46. The mobile device of claim 45, wherein the communicating comprises displaying the purchase confirmation code for the loss prevention personnel on a display of the mobile device.

47. The mobile device of claim 45, wherein the communicating comprises transmitting the purchase confirmation code from the mobile device to a device operated by the loss prevention personnel.

48. The mobile device of claim 45, wherein the method further comprises receiving, at the mobile device, a replacement purchase confirmation code from the purchase facilitating service provider after the communicating.

* * * * *